United States Patent
Wang et al.

(10) Patent No.: US 12,356,478 B2
(45) Date of Patent: Jul. 8, 2025

(54) COMMUNICATION METHOD, COMMUNICATIONS APPARATUS, COMPUTER STORAGE MEDIUM, AND COMMUNICATIONS SYSTEM

(71) Applicant: HUAWEI TECHNOLOGIES CO., LTD., Shenzhen (CN)

(72) Inventors: Rui Wang, Shanghai (CN); Mingzeng Dai, Shenzhen (CN); Qinghai Zeng, Shanghai (CN); Haibo Xu, Beijing (CN); Yang Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 17/669,692

(22) Filed: Feb. 11, 2022

(65) Prior Publication Data
US 2022/0167445 A1 May 26, 2022

Related U.S. Application Data

(63) Continuation of application No. PCT/CN2019/100853, filed on Aug. 15, 2019.

(51) Int. Cl.
*H04W 76/15* (2018.01)
*H04L 1/00* (2006.01)
(Continued)

(52) U.S. Cl.
CPC .......... *H04W 76/15* (2018.02); *H04L 1/0025* (2013.01); *H04W 76/19* (2018.02); *H04W 92/20* (2013.01)

(58) Field of Classification Search
CPC ..... H04W 76/15; H04W 76/27; H04W 76/19; H04W 92/20; H04L 1/0025; H04L 5/001; H04L 5/0098
See application file for complete search history.

(56) References Cited

U.S. PATENT DOCUMENTS 10,721,720 B2 * 7/2020 Damnjanovic ......... H04L 27/26
2013/0343324 A1 * 12/2013 Lin .................. H04W 72/0453
370/329
(Continued)

FOREIGN PATENT DOCUMENTS

CN 104936175 A 9/2015
CN 105451364 A 3/2016
(Continued)

OTHER PUBLICATIONS

International Search Report issued in corresponding International Application No. PCT/CN2019/100853, dated May 13, 2020, pp. 1-8.
(Continued)

*Primary Examiner* — Rasheed Gidado
(74) *Attorney, Agent, or Firm* — HAUPTMAN HAM, LLP

(57) ABSTRACT

This application provides a communication method, and a communications apparatus. The communication method includes: An access network device sends a deactivation indication or an activation indication to a terminal. The deactivation indication is used to indicate that a primary secondary cell in a secondary cell group is in a deactivated state, and the activation indication is used to indicate that the primary secondary cell is in an activated state. The access network device is a master node or a secondary node of the terminal. In receiving the deactivation indication or the activation indication, the terminal performs a deactivation operation on the secondary cell group according to the deactivation indication, or activates the secondary cell group according to the activation indication.

25 Claims, 13 Drawing Sheets

---

S401. A terminal receives a deactivation indication from an access network device, where the deactivation indication is used to indicate that a PSCell in an SCG is in a deactivated state

↓

S402. The terminal performs a deactivation operation on the secondary cell group according to the deactivation indication

(51) Int. Cl.
*H04W 76/19* (2018.01)
*H04W 92/20* (2009.01)

(56) References Cited

U.S. PATENT DOCUMENTS

| | | | | |
|---|---|---|---|---|
| 2014/0029595 | A1* | 1/2014 | Tsuboi | H04W 74/0833 |
| | | | | 370/336 |
| 2015/0271726 | A1* | 9/2015 | Kim | H04W 36/00692 |
| | | | | 370/329 |
| 2015/0341148 | A1* | 11/2015 | Kazmi | H04W 72/1273 |
| | | | | 370/252 |
| 2015/0373559 | A1* | 12/2015 | Hong | H04W 52/0206 |
| | | | | 370/329 |
| 2016/0044744 | A1* | 2/2016 | Lee | H04W 76/34 |
| | | | | 370/329 |
| 2017/0078984 | A1* | 3/2017 | Uemura | H04W 52/365 |
| 2018/0198867 | A1 | 7/2018 | Dao et al. | |
| 2018/0324577 | A1 | 11/2018 | Faccin et al. | |
| 2019/0124572 | A1 | 4/2019 | Park et al. | |
| 2019/0215899 | A1* | 7/2019 | Ma | H04L 5/0098 |
| 2020/0022215 | A1* | 1/2020 | Takahashi | H04W 76/27 |
| 2020/0267631 | A1* | 8/2020 | Yilmaz | H04W 48/20 |
| 2021/0068186 | A1* | 3/2021 | Wu | H04W 76/27 |

FOREIGN PATENT DOCUMENTS

| | | |
|---|---|---|
| CN | 108616950 A | 10/2018 |
| CN | 109104773 A | 12/2018 |
| CN | 109246824 A | 1/2019 |
| CN | 109548099 A | 3/2019 |
| CN | 112312489 A | 2/2021 |
| WO | 2015197904 A1 | 12/2015 |
| WO | 2018128870 A2 | 7/2018 |
| WO | 2019031515 A1 | 2/2019 |

OTHER PUBLICATIONS

Huawei, S2-1901802, "Handover procedure between PLMN and SNPN", 3GPP TSG-SA WG2 Meeting #131, Feb. 19, 2019, total 5 pages.
SA WG2 Meeting #133, S2-1906553, SNPN subscription data provisioning, Samsung, Ericsson, May 13-17, 2019, Reno, NV, USA, total 10 pages.
3GPP TSG-SA WG2 Meeting #132, S2-1903385, Harmonized solution for support of Non-Public Networks, Ericsson, Xi'an, China, Apr. 8-12, 2019, total 37 pages.
3GPP TS 38.413 V15.4.0: "3rd Generation Partnership Project; Technical Specification Group Radio Access Network; NG-RAN; NG Application Protocol (NGAP)(Release 15)", Jul. 2019, total 328 pages.
Ren Chi et al: "Study on Integrated Networking and Interoperation for 4G and 5G", Jan. 15, 2018, total 6 pages.
3GPP TSG-SA WG2 Meeting #134, S2-1907470, Support for access to PLMN services via SNPN and SNPN services via PLMN, Intel, Ericsson, Sapporo, Japan, Jun. 24-Jun. 28, 2019, total 6 pages.
International Search Report issued in corresponding International Application No. PCT/CN2020/108320, dated Nov. 17, 2020, pp. 1-8.
Chinese Office Action issued in corresponding Chinese Application No. 201910811311.9, dated Jun. 19, 2021, pp. 1-5.
Chinese Search Report issued in corresponding Chinese Application No. 201910811311.9, dated Jun. 18, 2021, pp. 1-4.
Chinese Office Action issued in corresponding Chinese Application No. 201910811311.9, dated Jan. 20, 2022, pp. 1-13.

* cited by examiner

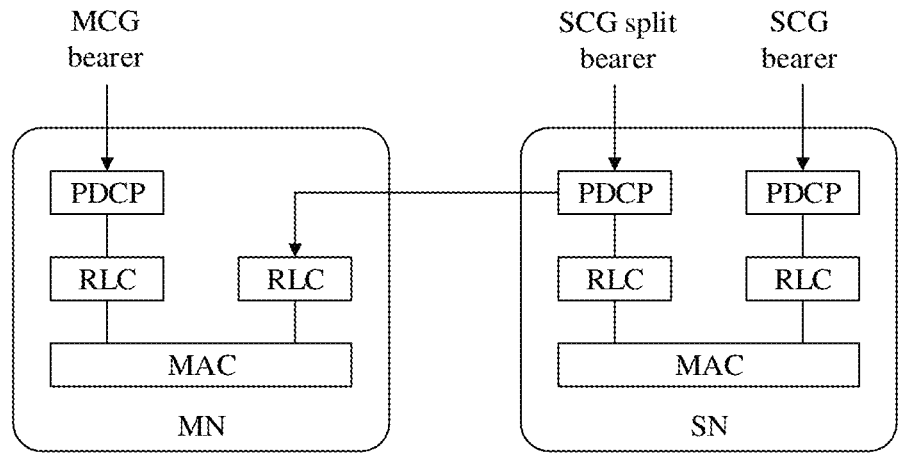

FIG. 3(b)

S401. A terminal receives a deactivation indication from an access network device, where the deactivation indication is used to indicate that a PSCell in an SCG is in a deactivated state S402. The terminal performs a deactivation operation on the secondary cell group according to the deactivation indication

FIG. 4

| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

FIG. 5

S601. A terminal receives an activation indication from an access network device, where the activation indication indicates that a PSCell in an SCG is in an activated state

S602. The terminal activates the secondary cell group according to the activation indication

FIG. 6

S701. A first access network device determines to deactivate a secondary cell group

S702. The first access network device sends a deactivation indication to a terminal, where the deactivation indication is used to indicate that a PSCell in the SCG is in a deactivated state

S703. The first access network device sends indication information to a second access network device, where the indication information is used to indicate that the SCG has been deactivated

FIG. 7

COMMUNICATION METHOD, COMMUNICATIONS APPARATUS, COMPUTER STORAGE MEDIUM, AND COMMUNICATIONS SYSTEM

CROSS-REFERENCE TO RELATED APPLICATIONS

This application is a continuation of International Patent Application No. PCT/CN2019/100853, filed on Aug. 15, 2019. The disclosures of the aforementioned application is hereby incorporated by reference in its entirety.

TECHNICAL FIELD

This application relates to the communications field, and in particular, to a communication method, a communications apparatus, a computer storage medium, and a communications system.

BACKGROUND

A next generation (next generation, NG) communications system can support shorter latency, larger bandwidth, and a large quantity of connections. In the next generation communications system, a dual connectivity (dual connectivity, DC) technology can enable a terminal to obtain transmission resources from both a master node (master node, MN) and a secondary node (secondary node, SN) that are located on a network side, thereby improving radio resource utilization and increasing a transmission rate.

However, when a DC operation is configured for the terminal, the terminal listens to and transmit data on both an air interface link provided by a master cell group (master cell group, MCG) and an air interface link provided by a secondary cell group (secondary cell group, SCG). Therefore, energy consumption is relatively high. When an operating status of the terminal changes, for example, when the terminal is in a low-data-rate state, if the terminal is always in a DC operating mode, retaining the SCG link causes high energy consumption of the terminal and a network-side device.

SUMMARY

Embodiments of this application provide a communication method, a communications apparatus, a storage medium, and a communications system, to reduce energy consumption of a terminal and a network-side device during DC communication.

According to a first aspect, this application provides a communication method, including: receiving a deactivation indication from an access network device, where the deactivation indication is used to indicate that a primary secondary cell in a secondary cell group is in a deactivated state, the access network device is a master node or a secondary node of a terminal, the master node manages a master cell group, the secondary node manages the secondary cell group, and the master cell group and/or the secondary cell group are/is used for data communication of the terminal; and performing a deactivation operation on the secondary cell group according to the deactivation indication.

The communication method may be performed by a terminal or a chip applied to a terminal.

With the communication method provided in the first aspect, the terminal performs the deactivation operation on the secondary cell group according to the indication of the master node or the secondary node, to suspend link communication of the secondary cell group, thereby reducing energy consumption of the terminal and a network side, and reducing signaling overheads without performing a secondary node release procedure.

In a possible implementation of the first aspect, the performing a deactivation operation on the secondary cell group according to the deactivation indication includes: determining, according to the deactivation indication, that the primary secondary cell is in the deactivated state.

In a possible implementation of the first aspect, the performing a deactivation operation on the secondary cell group according to the deactivation indication includes:
determining, according to the deactivation indication, that all secondary cells other than the primary secondary cell are in a deactivated state, or determining that all secondary cells are released.

In a possible implementation of the first aspect, the performing a deactivation operation on the secondary cell group according to the deactivation indication includes: retaining a configuration of the secondary cell group. The configuration of the secondary cell group may be used for dual connectivity communication between the secondary node and the terminal.

Optionally, the configuration of the secondary cell group includes any one or a combination of the following information: a secondary cell group radio link control bearer configuration, a packet data convergence protocol (Packet Data Convergence Protocol, PDCP) or service data adaptation protocol (Service Data Adaptation Protocol, SDAP) configuration of a bearer terminated at the secondary node, a primary secondary cell configuration, a secondary cell configuration, a physical layer configuration of the secondary cell group, a media access control (media access control, MAC) layer configuration of the secondary cell group, and a security context of the secondary node.

The configuration of the secondary cell group is retained. Therefore, when a secondary cell group link is to be used again to transmit data, the terminal can directly use the previously retained configuration without performing a secondary node addition procedure, to quickly resume the secondary cell group link, thereby reducing signaling overheads and improving communication efficiency.

In a possible implementation of the first aspect, the performing a deactivation operation on the secondary cell group according to the deactivation indication includes: stopping data transmission on a radio link control bearer of the secondary cell group.

In a possible implementation of the first aspect, the performing a deactivation operation on the secondary cell group according to the deactivation indication includes: stopping performing data communication by using a PDCP entity or an SDAP entity on the secondary node. For example, the PDCP/SDAP entity may be frozen or recovered.

In a possible implementation of the first aspect, the performing a deactivation operation on the secondary cell group according to the deactivation indication includes: stopping all or some of physical layer operations for the primary secondary cell.

In a possible implementation of the first aspect, the performing a deactivation operation on the secondary cell group according to the deactivation indication includes: stopping radio link failure (radio link failure, RLF) detection on the primary secondary cell, or stopping channel state information-reference signal (channel state information-reference signal, CSI-RS)-based radio link monitoring (radio link monitoring, RLM).

With the foregoing deactivation operations of stopping a terminal behavior, energy consumption of the terminal and the network side can be reduced, and link communication of a secondary cell can be stopped without performing a secondary node release procedure, thereby reducing signaling overheads.

In a possible implementation of the first aspect, the performing a deactivation operation on the secondary cell group according to the deactivation indication includes: performing radio resource measurement on the primary secondary cell as a serving cell or a neighbor cell of a serving cell.

In a possible implementation of the first aspect, the performing a deactivation operation on the secondary cell group according to the deactivation indication includes: sending, to the master node by using the master cell group, a measurement result based on a measurement configured by the secondary node, where the measurement configured by the secondary node is configured by using a signaling radio bearer between the secondary node and the terminal.

One or more of the foregoing deactivation operations may be implemented separately or in any combination.

In a possible implementation of the first aspect, the method further includes: receiving, from the access network device, a configuration parameter to be used after the secondary cell group is deactivated, where the configuration parameter includes a power parameter of the terminal.

According to a second aspect, this application provides a communication method, including: receiving an activation indication from an access network device, where the activation indication is used to indicate that a primary secondary cell in a secondary cell group is in an activated state, the access network device is a master node or a secondary node of a terminal, the master node manages a master cell group, the secondary node manages the secondary cell group, and the master cell group and/or the secondary cell group are/is used for data communication of the terminal; and activating the secondary cell group according to the activation indication.

The communication method may be performed by a terminal or a chip applied to a terminal.

In a possible implementation of the second aspect, the activating the secondary cell group according to the activation indication includes: using a configuration, of the secondary cell group, that is retained when a deactivation operation is performed on the secondary cell group. Specifically, the retained configuration of the secondary cell group may be used in dual connectivity communication between the secondary node and the terminal.

In a possible implementation of the second aspect, the activating the secondary cell group according to the activation indication includes: determining, according to the activation indication, that the primary secondary cell is in the activated state.

In a possible implementation of the second aspect, the activating the secondary cell group according to the activation indication includes: determining, according to the activation indication, that one or more secondary cells other than the primary secondary cell are in an activated state.

In a possible implementation of the second aspect, the activating the secondary cell group according to the activation indication includes: resuming transmitting data on a radio link control bearer of the secondary cell group.

In a possible implementation of the second aspect, the activating the secondary cell group according to the activation indication includes: resuming performing data communication by using a PDCP entity or an SDAP entity on the secondary node.

In a possible implementation of the second aspect, the activating the secondary cell group according to the activation indication includes: resuming a physical layer operation for the primary secondary cell in the secondary cell group.

In a possible implementation of the second aspect, the activating the secondary cell group according to the activation indication includes: resuming RLF detection or CSI-RS-based RLM on the primary secondary cell in the secondary cell group.

In a possible implementation of the second aspect, the activating the secondary cell group according to the activation indication includes: sending, to the secondary node by using the secondary cell group, a measurement result based on a measurement configured by the secondary node, where the measurement configured by the secondary node is configured by using a signaling radio bearer between the secondary node and the terminal.

In a possible implementation of the second aspect, the method further includes: receiving, from the access network device, a configuration parameter to be used after the secondary cell group is activated, where the configuration parameter includes a power parameter of the terminal.

In a possible implementation of the second aspect, the activating the secondary cell group according to the activation indication includes: initiating, by the terminal, random access on the primary secondary cell.

With the communication method provided in the second aspect, the terminal performs the activation operation on the secondary cell group according to the indication of the master node or the secondary node, to quickly resume link communication of the secondary cell group without initiating a secondary cell group addition procedure, thereby reducing energy consumption of the terminal and a network side, reducing signaling overheads, and improving communication efficiency.

According to a third aspect, this application provides a communication method, including: A first access network device determines to deactivate a secondary cell group. The first access network device is a master node or a secondary node of a terminal. The master node manages a master cell group, and the secondary node manages the secondary cell group. The master cell group and/or the secondary cell group are/is used for data communication of the terminal. The first access network device sends a deactivation indication to the terminal. The deactivation indication is used to indicate that a primary secondary cell in the secondary cell group is in a deactivated state.

In a possible implementation of the third aspect, that a first access network device determines to deactivate a secondary cell group includes: The first access network device determines to deactivate the secondary cell group, based on any one or more of auxiliary information provided by the terminal, a data transmission activity degree of the terminal on the first access network device, and auxiliary information provided by a second access network device. When the first access network device is the master node, the second access network device is the secondary node; or when the first access network device is the secondary node, the second access network device is the master node.

In a possible implementation of the third aspect, that a first access network device determines to deactivate a secondary cell group includes: The first access network device stops data transmission on a radio link control bearer of the secondary cell group.

In a possible implementation of the third aspect, that a first access network device determines to deactivate a secondary cell group includes: The first access network device stops processing data of the terminal by using a PDCP entity or an SDAP entity on the first access network device.

In a possible implementation of the third aspect, when the first access network device is the secondary node and the second access network device is the master node, that a first access network device determines to deactivate a secondary cell group includes: The first access network device sends downlink data processed by using a PDCP entity or an SDAP entity to the second access network device, so that the second access network device sends the downlink data to the terminal by using a master cell group bearer; and/or the first access network device receives uplink data from the second access network device, and sends the uplink data to a core network after processing the uplink data by using the PDCP entity or the SDAP entity.

In a possible implementation of the third aspect, when the first access network device is the secondary node and the second access network device is the master node, the method further includes: The first access network device indicates each of the second access network device and the terminal to stop transmitting, by using a master cell group radio link control bearer, data on a bearer terminated at the secondary node.

In a possible implementation of the third aspect, that a first access network device determines to deactivate a secondary cell group includes: The first access network device stops transmitting, on the primary secondary cell, all or some of signals transmitted between the first access network device and the terminal. The signals include data and/or signaling.

In a possible implementation of the third aspect, the method further includes: The first access network device sends indication information to the second access network device. The indication information is used to indicate that the secondary cell group has been deactivated.

In a possible implementation of the third aspect, the indication information is used to indicate the second access network device to deactivate a data transmission tunnel corresponding to a secondary cell group radio link control bearer corresponding to a bearer terminated at the master node.

In a possible implementation of the third aspect, that the first access network device sends a deactivation indication to the terminal includes: The first access network device sends the deactivation indication to the terminal by using the second access network device.

With the communication method provided in the third aspect, the master node or the secondary node determines to deactivate the secondary cell group, and indicates the terminal to perform the deactivation operation, to quickly stop link communication of the secondary cell group, thereby reducing energy consumption of a network side and the terminal, and reducing signaling overheads without initiating a secondary node release procedure.

According to a fourth aspect, this application provides a communication method, including: A first access network device determines to activate a secondary cell group in a deactivated state. The first access network device is a master node or a secondary node of a terminal. The master node manages a master cell group, and the secondary node manages the secondary cell group. The master cell group and/or the secondary cell group are/is used for data communication of the terminal. The first access network device sends an activation indication to the terminal. The activation indication is used to indicate that a primary secondary cell in the secondary cell group is in an activated state.

In a possible implementation of the fourth aspect, that a first access network device determines to activate a secondary cell group includes: The first access network device determines to activate the secondary cell group, based on any one or more of auxiliary information provided by the terminal, a data transmission activity degree of the terminal on the first access network device, and auxiliary information provided by a second access network device.

In a possible implementation of the fourth aspect, that a first access network device determines to activate a secondary cell group includes: The first access network device resumes data transmission on a radio link control bearer of the secondary cell group.

In a possible implementation of the fourth aspect, that a first access network device determines to activate a secondary cell group includes: The first access network device resumes performing data communication with the terminal by using a PDCP entity or an SDAP entity on the first access network entity.

In a possible implementation of the fourth aspect, when the first access network device is the secondary node and the second access network device is the master node, the method further includes: The first access network device indicates each of the second access network device and the terminal to resume transmitting, by using a master cell group radio link control bearer, data on a bearer terminated at the secondary node.

In a possible implementation of the fourth aspect, that a first access network device determines to activate a secondary cell group includes: The first access network device resumes transmitting, on the primary secondary cell, a signal transmitted between the first access network device and the terminal.

In a possible implementation of the fourth aspect, the first access network device sends indication information to the second access network device. The indication information is used to indicate that the secondary cell group has been activated.

In a possible implementation of the fourth aspect, the indication information is used to indicate the second access network device to activate a data transmission tunnel of an interface, between access network devices, that corresponds to a secondary cell group radio link control bearer corresponding to a bearer terminated at the master node.

In a possible implementation of the fourth aspect, that the first access network device sends an activation indication to the terminal includes: The first access network device sends the activation indication to the terminal by using the second access network device.

With the communication method provided in the fourth aspect, the master node or the secondary node determines to activate the secondary cell group, and indicates the terminal to perform the activation operation, to quickly resume link communication of the secondary cell group, thereby reducing energy consumption of a network side and the terminal, and reducing signaling overheads without initiating a secondary node addition procedure.

The deactivation indication or the activation indication described in the foregoing aspects may be included in physical layer signaling, or included in a MAC control element (control element, CE), or included in a radio resource control (radio resource control, RRC) message.

When the deactivation indication is included in a MAC CE, the deactivation indication may be one or more bits in the MAC CE. Optionally, the deactivation indication corresponds to a serving cell identifier of the primary secondary cell. Optionally, in addition to including the indication indicating that the primary secondary cell is in the deactivated state, the MAC CE may be further used to indicate an activated state or a deactivated state of another secondary cell, and each secondary cell corresponds to a bit in the MAC CE.

According to a fifth aspect, an embodiment of this application provides a communications apparatus. The apparatus has a function of implementing the behavior of the terminal in the communication method shown in the first aspect or the second aspect. The function may be implemented by hardware, or may be implemented by hardware executing corresponding software. The hardware or software includes one or more units or means (means) corresponding to the function.

In a possible design, the apparatus includes a processor. The processor is configured to support the apparatus in performing a corresponding function of the terminal in the foregoing communication method. The apparatus may further include a memory. The memory may be coupled to the processor, and the memory stores program instructions and data that are specified for the apparatus. Optionally, the apparatus further includes a transceiver. The transceiver is configured to support communication between the apparatus and a network element such as a relay device or an access network device. The transceiver may be an independent receiver, an independent transmitter, or a transceiver having transmission and reception functions.

In a possible implementation, the communications apparatus may be a terminal, or a component, for example, a chip, a chip system, or a circuit, that can be used in the terminal.

According to a sixth aspect, an embodiment of this application provides a communications apparatus. The apparatus has a function of implementing the behavior of the access network device in the communication method shown in the third or fourth aspect. The function may be implemented by hardware, or may be implemented by hardware executing corresponding software. The hardware or software includes one or more units or means (means) corresponding to the function.

In a possible design, the apparatus includes a processor. The processor is configured to support the apparatus in performing a corresponding function of the access network device in the foregoing communication method. The apparatus may further include a memory. The memory may be coupled to the processor, and the memory stores program instructions and data that are specified for the apparatus.

In a possible implementation, the communications apparatus may be an access network device, for example, a base station, or a component that can be used in the access network device, for example, a chip, a chip system, or a circuit.

Optionally, the apparatus further includes a transceiver. The transceiver may be configured to: support communication between the access network device and a terminal, and send the information or the instruction in the foregoing communication method to the terminal. The transceiver may be an independent receiver, an independent transmitter, or a transceiver having transmission and reception functions.

According to a seventh aspect, an embodiment of this application provides a communications system, including a first access network device that serves as a master node, a second access network device that serves as a secondary node, and a terminal. The terminal may access both the first access network device and the second access network device.

According to an eighth aspect, an embodiment of this application provides a computer-readable storage medium. The computer-readable storage medium stores instructions. When the instructions are run on a computer, the computer is enabled to perform the communication method in any one of the foregoing aspects.

According to a ninth aspect, an embodiment of this application provides a computer program product including instructions. When the instructions are run on a computer, the computer is enabled to perform the communication method in any one of the foregoing aspects.

BRIEF DESCRIPTION OF DRAWINGS

To describe technical solutions in embodiments of this application more clearly, the following briefly describes the accompanying drawings used in describing the embodiments. It is clear that the accompanying drawings in the following description show merely some embodiments of this application, and a person of ordinary skill in the art may still derive other drawings from these accompanying drawings without creative efforts.

FIG. 3(b) is a schematic diagram of a wireless protocol architecture of dual connectivity according to an embodiment of this application;

FIG. 4 is a schematic flowchart of a communication method according to an embodiment of this application;

FIG. 5 is a schematic diagram of a MAC CE according to an embodiment of this application;

FIG. 6 is a schematic flowchart of a communication method according to an embodiment of this application;

FIG. 7 is a schematic flowchart of a communication method according to an embodiment of this application;

DESCRIPTION OF EMBODIMENTS

Figure 1:
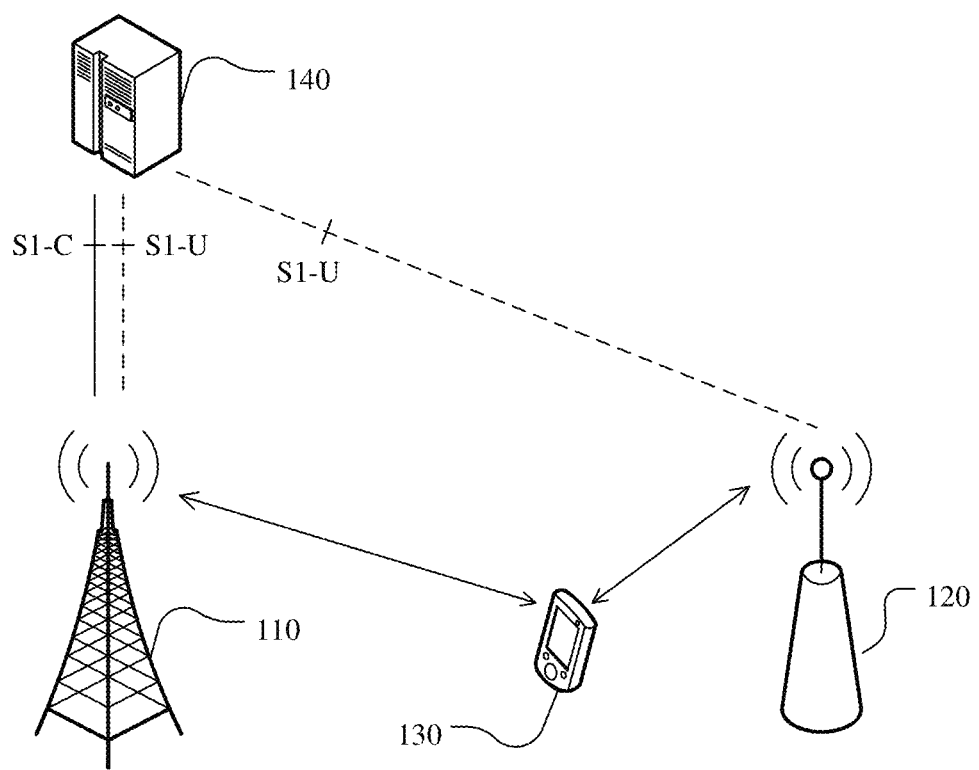
FIG. 1 is a schematic diagram of a communications system 100 according to an embodiment of this application.

FIG. 1 is a schematic diagram of a communications system 100 according to an embodiment of this application. As shown in FIG. 1, a terminal 130 supports dual connectivity (dual connectivity, DC), and an access network device 110 and an access network device 120 jointly provide a data transmission service for the terminal 130. The access network device 110 is a master node (Master Node, MN), and the access network device 120 is a secondary node (secondary node, SN). There is a control plane connection between the MN 110 and a core network (Core Network, CN) 140, and there may be further a user plane connection between the MN 110 and the core network 140. There may or may not be a user plane connection between the SN 120 and the core network 140. S1-U is used to indicate the user plane connection, and S1-C is used to indicate the control plane connection. It can be understood that both or either of the user plane connection between the MN 110 and the core network 140 and the user plane connection between the SN 120 and the core network 140 may exist. When the SN 120 does not have a user plane connection to the core network 140, data of the terminal 130 may be offloaded by the MN 110 to the SN 120 at a packet data convergence protocol (packet data convergence protocol, PDCP) layer. When there is no user plane connection between the MN 110 and the core network 140, data of the terminal 130 may be offloaded by the SN 120 to the MN 110 at the PDCP layer. The MN may also be referred to as a master base station or a master access network device, and the SN may also be referred to as a secondary base station or a secondary access network device.

In this application, the terminal 130 may be a device of various types that provides a user with voice and/or data connectivity, for example, may be a handheld device having a wireless connection function, or a processing device connected to a wireless modem. The terminal may communicate with a core network by using an access network such as a radio access network (radio access network, RAN), and exchange voice and/or data with the RAN. The terminal may refer to user equipment (user equipment, UE), a wireless terminal, a mobile terminal, a subscriber unit (subscriber unit), a subscriber station (subscriber station), a mobile station (mobile), a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer with a mobile terminal, a portable, pocket-sized, handheld, computer built-in, or in-vehicle mobile apparatus, or a smart wearable device. For example, the terminal is a device such as a personal communications service (personal communications service, PCS) phone, a cordless phone, a session initiation protocol (session initiation protocol, SIP) phone, a wireless local loop (wireless local loop, WLL) station, a personal digital assistant (personal digital assistant, PDA), a smart band, or a smart watch. The terminal further includes a limited device, for example, a device with relatively low power consumption, a device with a limited storage capability, or a device with a limited computing capability. For example, the terminal includes an information sensor device such as a barcode, radio frequency identification (radio frequency identification, RFID), a sensor, a global positioning system (global positioning system, GPS), or a laser scanner. In addition, the terminal 130 may be alternatively an uncrewed aerial vehicle device. In the embodiments of this application, a chip used in the foregoing device may also be referred to as a terminal.

The communications system in this application may be a long term evolution (long term evolution, LTE) wireless communications system, a 5th generation (5th generation, 5G) mobile communications system such as a new radio (new radio, NR) system, another next generation (next generation, NG) communications systems, or the like. This is not limited in this application.

In this application, the access network device 110 and the access network device 120 may be base stations defined by the 3rd generation partnership project (3rd generation partnership project, 3GPP). For example, the radio access network device may be a base station device in the LTE system, namely, an evolved Node B (evolved NodeB, eNB/eNodeB), or may be an access network side device in the NR system, including a gNB, a transmission point (transmission/reception point, TRP), and the like. The access network device 110 or the access network device 120 may include a central unit (central unit, CU) and a distributed unit (distributed unit, DU). The CU may also be referred to as a control unit (control unit). The CU-DU structure may be used to split protocol layers of the base station. Functions of some protocol layers are deployed on the CU for centralized control, and functions of some or all of remaining protocol layers are distributed on the DU. The CU centrally controls the DU. For example, radio resource control (Radio Resource Control, RRC), service data adaptation protocol (Service Data Adaptation Protocol, SDAP), and packet data convergence protocol (Packet Data Convergence Protocol, PDCP) layers may be deployed on the CU, and a radio link control (Radio Link Control, RLC) layer, a media access control (Media Access Control, MAC) layer, and a physical (Physical) layer are deployed on the DU. The CU and the DU are connected through an F1 interface. The CU that represents the gNB is connected to the core network through an NG interface. Optionally, a structure in which a control plane (control plane) entity is separated from a user plane (user plane, UP) entity may be alternatively used for the CU, and one control plane entity manages a plurality of user plane entities. In an example, one gNB may have one gNB-CU-CP, a plurality of gNB-CU-UPs, and a plurality of gNB-DUs. One gNB-CU-CP is connected to a plurality of gNB-CU-UPs through E1 interfaces. One gNB-CU-CP may be connected to a plurality of gNB-DUs through F1-C interfaces. One gNB-DU may be connected to a plurality of gNB-CU-UPs through F1-U interfaces.

In addition, when the eNB accesses an NR core network, which is also referred to as a next generation core network (Next Generation Core, NGC) or a 5G core network (5th Generation Core Network, 5GC), the LTE eNB may also be referred to as an eLTE eNB. Specifically, the eLTE eNB is an evolved LTE base station device based on the LTE eNB, and may be directly connected to the 5G CN. The eLTE eNB also belongs to a base station device in NR. The access network device 101 or the access network device 102 may be alternatively a wireless terminal (wireless terminal, WT), for example, an access point (access point, AP), an access controller (access controller, AC), or another network device, for example, a relay device, a vehicle-mounted device, or an intelligent wearable device, that has a capability of communicating with a terminal and the core network. A type of a network device is not limited in the embodiments of this application.

Figure 2A:
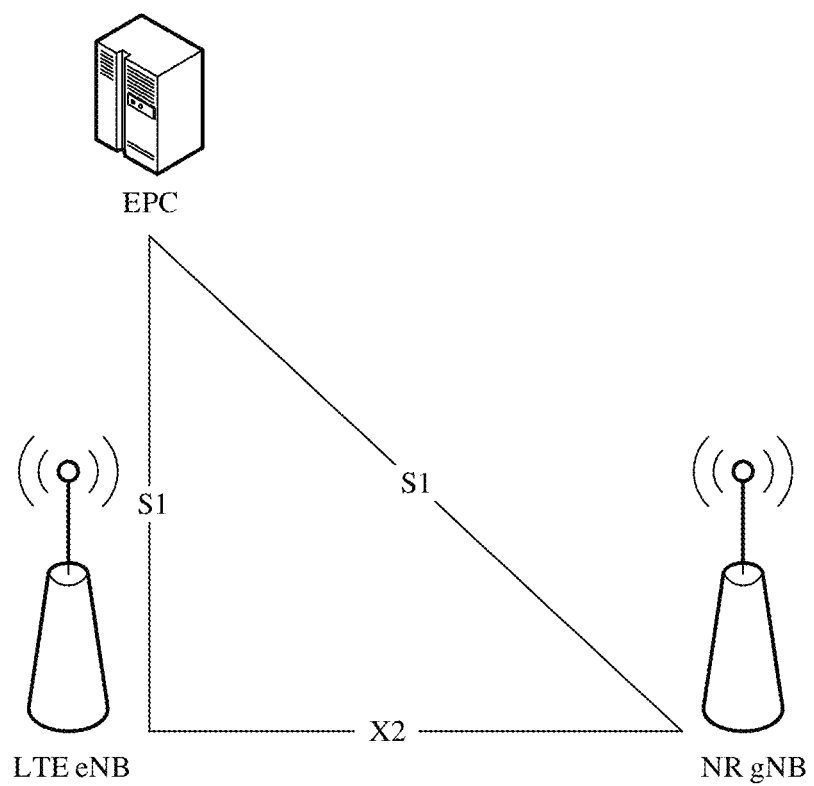
FIG. 2(a) is a schematic diagram of an NR-NR dual connectivity scenario according to an embodiment of this application.

Dual connectivity may be implemented between access network devices of a same standard. As shown in FIG. 2(a), in an NR standalone scenario, both the MN 110 and the SN 120 are NR gNBs, and there is an Xn interface between the MN 110 and the SN 120. There is an NG interface between the MN 110 and the NGC, there is at least a control plane connection, and there may be further a user plane connection. There is an NG-U interface between the SN 120 and the 5GC, that is, there may be only a user plane connection. The NGC may include function entities such as a access and mobility management function (core access and mobility management function, AMF) network element and a user plane function (user plane function, UPF) network element.

Dual connectivity may be alternatively implemented between access network devices of different RATs. This may be referred to as multi-RAT DC (Multi-RAT DC, MR-DC). Different radio access technologies (radio access technology, RAT) are used for the MN and the SN. A multi-RAT dual connectivity (multi-RAT DC, MR-DC) architecture supports a plurality of bearer types, and different types of bearers may be distinguished depending on whether the MN or the SN is used as an anchor of a packet data convergence protocol (Packet Data Convergence Protocol, PDCP) layer. In addition, a bearer type may change. For example, dual connectivity may be implemented in a scenario of joint networking of LTE and NR, and is referred to as LTE-NR dual connectivity, so that the terminal may simultaneously obtain radio resources from LTE and NR air interfaces to perform data transmission, and obtain a gain of a transmission rate. The LTE-NR dual connectivity may include the following three architectures. The following describes the three architectures with reference to FIG. 2(b), FIG. 2(c), and FIG. 2(d) respectively.

Figure 2B:
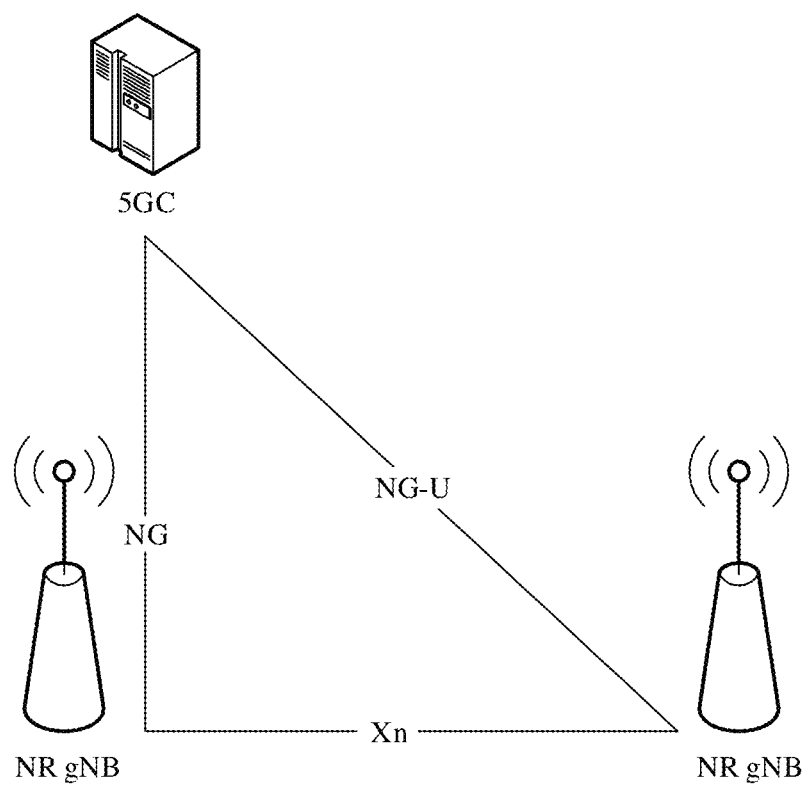
FIG. 2(b) is a schematic diagram of an LTE-NR dual connectivity scenario according to an embodiment of this application.

FIG. 2(b) is a schematic diagram of an LTE-NR dual connectivity scenario according to an embodiment of this application. As shown in FIG. 2(b), an LTE eNB serves as an MN, and an NR gNB serves as an SN. There is an X2 interface between the LTE eNB and the NR gNB. There is an S1 interface between the LTE eNB and an evolved packet core (evolved Packet Core, EPC) of an LTE system, there is at least a control plane connection, and there may be further a user plane connection. There is an S1-U interface between the NR gNB and the EPC, that is, there may be only a user plane connection. It can be learned that in the scenario shown in FIG. 2(b), the LTE eNB is used as an anchor, and the LTE eNB accesses the LTE core network.

Figure 2C:
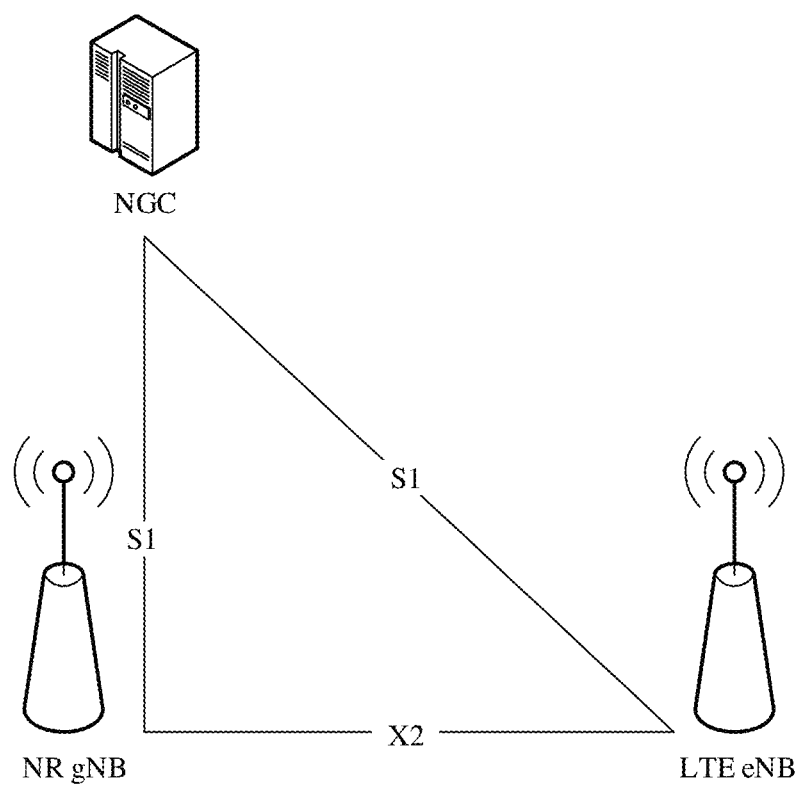
FIG. 2(c) is a schematic diagram of an LTE-NR dual connectivity scenario according to an embodiment of this application.

FIG. 2(c) is a schematic diagram of another LTE-NR dual connectivity scenario according to an embodiment of this application. A difference between FIG. 2(c) and FIG. 2(b) lies in that, an NR gNB serves as an anchor, the NR gNB accesses an NGC, the NR gNB serves as an MN, there is an NG interface between the NR gNB and the NGC, and the NR gNB may establish a control plane connection and a user plane connection for a terminal; and an LTE eNB serves as an SN, there is an NG-U interface between the LTE eNB and the NGC, and the LTE eNB establishes only a user plane connection for the terminal.

Figure 2D:
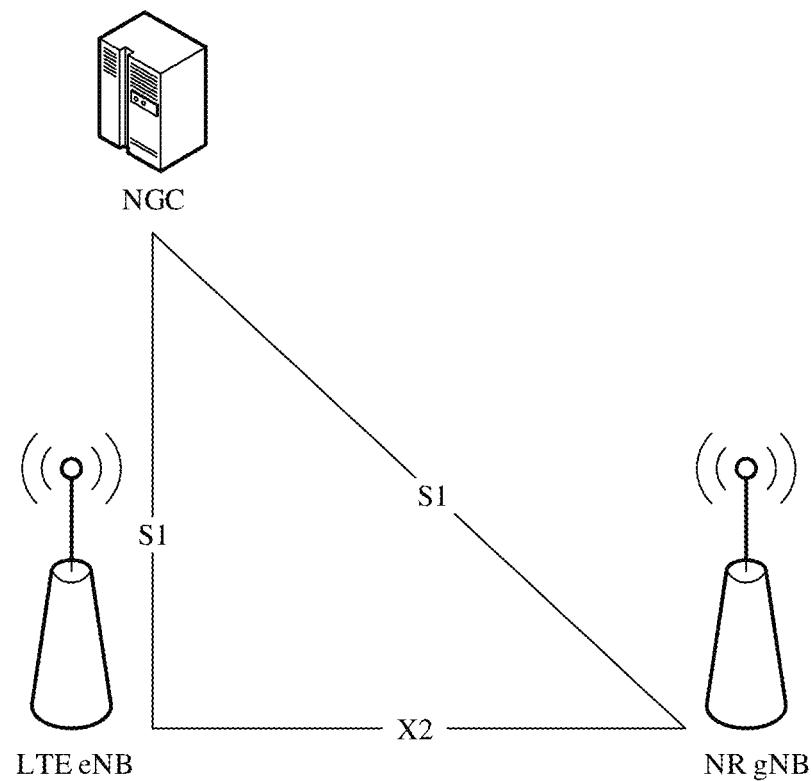
FIG. 2(d) is a schematic diagram of an LTE-NR dual connectivity scenario according to an embodiment of this application.

FIG. 2(d) is a schematic diagram of still another LTE-NR dual connectivity scenario according to an embodiment of this application. Similar to FIG. 2(b), in FIG. 2(d), an LTE eNB is used as an anchor, and a difference lies in that the LTE eNB accesses an NGC. To be specific, the LTE eNB serves as an MN, there is an NG interface between the LTE eNB and the NGC, the LTE eNB may establish a control plane connection and a user plane connection for a terminal; and an NR gNB serves as an SN, there is an NG-U interface between the NR gNB and the NGC, and the NR gNB establishes only a user plane connection for the terminal.

In the foregoing four scenarios, no user plane connection may be established between the SN and the core network, but data is transferred by using the MN. For example, in a downlink direction, data of the terminal first arrives at the MN, and the MN offloads the data of the terminal to the SN at a PDCP layer. A form of the offloaded data is, for example, a PDCP protocol data unit (Protocol Data Unit, PDU). When there is no user plane connection between the MN and the core network, but there is a user plane connection between the SN and the core network, data of the terminal may be alternatively transmitted by the core network to the SN, and offloaded by the SN to the MN. Details are not described again.

In dual connectivity, a data radio bearer (Data Radio Bearer, DRB) established between a terminal and an access network side may be independently provided by an MN or an SN, or may be provided by both the MN and the SN. A bearer provided by the MN is referred to as a master cell group bearer (master cell group bearer, MCG bearer). An MCG includes at least one cell that is managed by the MN and that is configured to provide an air interface transmission resource for the terminal. A bearer provided by the SN is referred to as a secondary cell group bearer (secondary cell group bearer, SCG bearer). An SCG includes at least one cell that is managed by the SN and that is configured to provide an air interface transmission resource for the terminal. In addition, a bearer provided by both the MN and the SN is referred to as a split bearer (split bearer).

When the MCG includes only one cell, the cell is a primary cell (primary cell, PCell) of the terminal. When the SCG includes only one cell, the cell is a primary secondary cell (primary secondary cell, PSCell) of the terminal. The PCell and the PSCell may be collectively referred to as a special cell (special cell, SpCell). When the MCG or the SCG includes a plurality of cells, all cells other than an SpCell may be referred to as a secondary cell (secondary cell, SCell). In this case, an SCell and an SpCell in each cell group undergo carrier aggregation (carrier aggregation, CA) to jointly provide a transmission resource for the terminal. The PSCell is a cell, among cells in the SCG, on which the UE is indicated to perform random access or initial PUSCH transmission. The SCell is a cell operating on a secondary carrier. Once an RRC connection is established, the SCell may be configured to provide an additional radio resource.

Figure 3A:
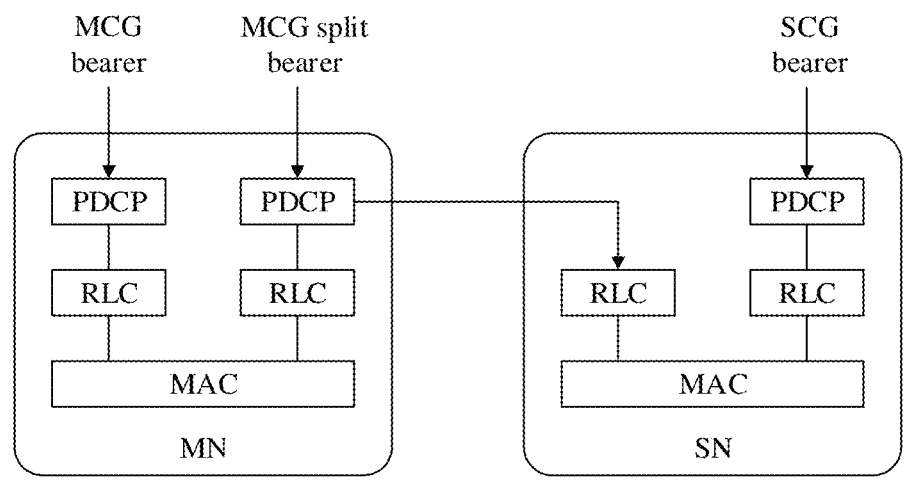
FIG. 3(a) is a schematic diagram of a wireless protocol architecture of dual connectivity according to an embodiment of this application.

Descriptions are provided below with reference to FIG. 3(a) and FIG. 3(b). FIG. 3(a) and FIG. 3(b) each are a schematic diagram of a wireless protocol architecture of dual connectivity according to an embodiment of this application. As shown in FIG. 3(a) and FIG. 3(b), when a bearer is provided only by an MN, that is, a data flow flows only from a core network to the MN, the bearer is an MCG bearer (bearer). When a bearer is provided only by an SN, that is, a data flow flows only from a core network to the SN, the bearer is an SCG bearer. When a bearer is provided by both an MN and an SN, that is, when a data flow is offloaded at the MN or the SN, the bearer is a split bearer (split bearer). For distinction, when the data flow is offloaded at the MN, the bearer may be referred to as an MCG split bearer (as shown in FIG. 3(a)); when the data flow is offloaded at the SN, the bearer may be referred to as an SCG split bearer (as shown in FIG. 3(b)). It can be learned from FIG. 3(a) and FIG. 3(b) that each bearer type has corresponding PDCP layer processing and RLC layer processing. For example, the SCG bearer or the SCG split bearer corresponds to an SCG RLC bearer and an SN terminated PDCP bearer.

Depending on whether a PDCP entity is established on the MN or the SN, bearers in DC may be further classified into the following types, including: an MN terminated MCG bearer (MN terminated MCG bearer), an MN terminated SCG bearer (MN terminated SCG bearer), an MN terminated split bearer (MN terminated split bearer), an SN terminated MCG bearer (SN terminated MCG bearer), an SN terminated SCG bearer (SN terminated SCG bearer), and an SN terminated split bearer (SN terminated split bearer). For an MN terminated bearer, a PDCP entity is established on the MN, and a user plane connection to the core network is terminated at the MN, that is, the MN serves as an anchor (anchor). For an SN terminated bearer, a PDCP entity is established on the SN, and a user plane connection to the core network is terminated at the SN, that is, the SN serves as an anchor. It can be understood that whether a bearer is terminated at the MN or the SN indicates whether data transmission with the core network is performed by using the MN or the SN, and an air interface transmission resource is provided by the MCG or the SCG. For example, if the MN terminated SCG bearer is used, downlink data delivered by the core network is processed by a PDCP layer of the MN, and then all the downlink data is transferred to an RLC layer and a MAC layer of the SN for further processing, and is sent to the terminal by using the SCG. Correspondingly, uplink data sent by the terminal is processed by the MAC layer and the RLC layer of the SN, and then all the uplink data is transferred to the PDCP layer of the MN for processing, and is sent to a core network device through an interface between the MN and the core network. If the MN terminated split bearer is used, downlink data delivered by the core network is processed by the PDCP layer of the MN, then a part of the data is transferred to the SN, and is sent to the terminal by using the SCG, and a remaining part is still sent by the MN to the terminal by using the MCG. Correspondingly, a part of uplink data sent by the terminal is sent to the MN by using the MCG, the other part is sent to the SN by using the SCG, and the two parts of data are aggregated at the PDCP layer of the MN for processing, and are sent to the core network device through the interface between the MN and the core network.

During dual connectivity communication between the terminal 130 and the MN 110 and the SN 120, if a data rate of the terminal 130 decreases, that is, the terminal 130 enters a low-data-rate state, and if the terminal remains in a DC operating mode, energy consumption of an SCG link is a waste. In this case, for power saving on a network side and power saving of the UE, the network side may configure the terminal 130 to release a DC operation. When the data rate of the terminal 130 increases, the network side may reconfigure a DC operation for the terminal 130. However, when an SN release (SN release) procedure is used to release the DC operation for the terminal 130, and an SN addition (SN addition) procedure is used to re-add the SN 120 or another access network device as an SN for the terminal 130, a plurality of pieces of information are exchanged between the MN 110 and the SN 120 or the another access network device in a process of performing SN addition and SN release, and the MN 110 is to perform reconfiguration for the UE on an air interface, thereby causing additional signaling overheads and a delay, and reducing communication efficiency.

As defined in the embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

The resources in the embodiments of this application may also be referred to as transmission resources, including one or more of time domain resources, frequency domain resources, and code channel resources. The resources may be used to bear data or signaling in an uplink communication process or a downlink communication process.

It should be understood that the term "and/or" in this specification describes only an association relationship between associated objects and represents that three relationships may exist. For example, A and/or B may represent the following three cases: Only A exists, both A and B exist, and only B exists. In addition, the character "I" in this specification indicates an "or" relationship between the associated objects.

It should be understood that in the embodiments of the present disclosure, "B corresponding to A" indicates that B is associated with A, and B may be determined according to A. However, it should be further understood that determining B according to A does not mean that B is determined according to A only; that is, B may also be determined according to A and/or other information.

"A plurality of" in the embodiments of this application refers to two or more than two.

Descriptions such as "first" and "second" in the embodiments of this application are merely used for indicating and distinguishing between described objects, do not show a sequence, do not indicate a specific limitation on a quantity of devices in the embodiments of this application, and cannot constitute any limitation on the embodiments of this application.

"Connection" in the embodiments of this application means various connection manners such as a direct connection or an indirect connection, for implementing communication between devices. This is not limited in the embodiments of this application.

Unless otherwise specified, "transmit/transmission" (transmit/transmission) in the embodiments of this application refers to bidirectional transmission, and includes a sending action and/or a receiving action. Specifically, "transmit/transmission" in the embodiments of this application includes data sending, data receiving, or data sending and data receiving. In other words, data transmission herein includes uplink and/or downlink data transmission. The data may include a channel and/or a signal. The uplink data transmission is uplink channel transmission and/or uplink signal transmission, and the downlink data transmission is downlink channel transmission and/or downlink signal transmission.

Services (service) in the embodiments of this application are communication service obtained by a terminal device from a network side, and include control plane services and/or data plane services, for example, voice services and data traffic services. Sending or receiving of the services includes sending or receiving of service-related data (data) or signaling (signaling).

"Network" and "system" in the embodiments of this application express a same concept, and a communications system is a communications network.

It can be understood that in the embodiments of this application, the terminal and/or an access network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all operations in the embodiments of this application may be performed.

To deactivate an SCG, as shown in FIG. 4, this application provides a communication method. The method may be applied to the foregoing DC communication architecture. The method may be implemented by a terminal or an apparatus, such as a chip, applied to a terminal. In this embodiment of this application, an example in which a terminal performs the communication method is used for description.

The method includes the following steps.

S401. A terminal receives a deactivation (deactivation) indication from an access network device, where the deactivation indication is used to indicate that a PSCell in an SCG is in a deactivated state.

The access network device is an MN or an SN of the terminal. The master node manages an MCG, and the secondary node manages the SCG. The MCG and/or SCG are/is used for data communication of the terminal.

The terminal is in a DC communication process. Specifically, the terminal supports DC communication. The terminal first accesses the MN, and determines, by using the MN, to add the SN to perform DC communication. In the DC communication process, the terminal may perform data transmission with the MN and/or the SN by using different types of radio bearers. The MN and the SN each may provide an air interface transmission resource for data transmission between the terminal and a core network. The communication method provided in this application is applicable to any DC architecture, and types of the MN and the SN are not limited. For example, the MN and the SN may be access network devices of a same RAT (RAT), for example, both the MN and the SN are gNBs; or may be access network devices of different RATs, for example, the MN is an eNB, and the SN is a gNB. For detailed descriptions of various DC architectures, refer to the foregoing descriptions. Details are not described herein again.

The deactivation indication in this application may also be referred to as a deactivation command (command) Deactivation may mean that the terminal temporarily stops transmitting data by using a communication link of the SCG, but the terminal retains or stores some or all of configurations of the SN, to quickly resume the communication link of the SCG. Similarly, that the PSCell is in the deactivated state indicates that a configuration of the PSCell may be retained but data transmission performed by using the PSCell is suspended. In this application, deactivation (deactivate/deactivation) may also be referred to as suspending (suspend/suspension) or dormancy. The deactivated state (deactivated state) may also be referred to as a suspended state, a dormant state, or an inactive state.

Optionally, in an implementation of this application, the deactivation indication is included in a media access control (media access control, MAC) control element (CE, control element), and the deactivation indication is one or more bits in the MAC CE. Optionally, the MAC CE may be a MAC CE used to indicate an activated/deactivated state of an SCell, or may be a MAC CE specially designed for the deactivation indication. The specially designed MAC CE corresponds to an independent logical channel identity (Logical Channel Identity, LCID). The SCell is a secondary cell managed by the MN or the SN other than the PSCell.

In an implementation, when the MAC CE used to indicate the activated/deactivated state of the SCell is used to carry the deactivation indication, a reserved (reserved) bit in the MAC CE may be used as the deactivation indication; or a bit corresponding to a serving cell identifier (serving cell ID) or a serving cell index (index) of the PSCell may be used as the deactivation indication. One or more bits in the MAC CE other than the reserved bit may be respectively used to indicate an activated/deactivated state of one or more corresponding SCells.

FIG. 5 is a schematic diagram of a format of a 4-byte MAC CE. The MAC CE includes one reserved bit (denoted as R in the figure) and 31 activation/deactivation bits. The network side may provide the configuration of the PSCell for the UE by using a radio resource control (radio resource control, RRC) message. The configuration of the PSCell includes a serving cell identifier or index (ServCellIndex) of the PSCell. In addition, the network side may further provide a configuration of the SCell for the UE by using a radio resource control message. The configuration of the SCell includes a correspondence between an SCell identifier and an index (index) indicating the SCell. As shown in FIG. 5, for an SCell whose index is i, Ci indicates an activated/deactivated state of the SCell. For example, Ci=0 indicates that the SCell i is deactivated, and Ci=1 indicates that the SCell i is activated. A capability of the terminal is to support a maximum of 32 component carriers (component carrier, CC), including the PCell, the PSCell, and all SCells in the MCG and the SCG. If a reserved bit is used as the deactivation indication, R=0 may be set. If a bit corresponding to the serving cell ID of the PSCell (assuming that the bit is $C_{20}$ in the figure) is used as the deactivation indication, $C_{20}$=0 may be set.

Optionally, when the terminal receives the MAC CE including the deactivation indication and the terminal learns, through reading, that the PSCell is in the deactivated state, the terminal determines by default that all SCells in the SCG are also in a deactivated state, without reading a bit corresponding to each SCell. Alternatively, if the terminal learns, through reading, that the PSCell is in the deactivated state, the terminal determines by default that all SCells in the SCG have been released (release), and an RRC entity of the terminal releases configurations of the SCells.

Optionally, the deactivation indication may be alternatively included in another message/signaling sent by the access network device to the terminal. The message/signaling may be an existing message/signaling or a newly added message/signaling. For example, the message/signaling may be physical layer signaling such as an RRC message or downlink control information (downlink control information, DCI). For example, the deactivation indication may be added to an RRC reconfiguration message, or a special value in an existing message or information element is reused.

S402. The terminal performs a deactivation operation on the secondary cell group according to the deactivation indication.

Optionally, the terminal may perform any one or more of the following operations.

Operation 1: The terminal retains a configuration of the SCG.

The configuration of the SCG may be an RRC configuration of the SCG. The configuration may include any one or a combination of the following information: a secondary cell group radio link control bearer (SCG RLC bearer) configuration, a PDCP configuration or a service data adaptation protocol (service data adaptation protocol, SDAP) configuration of a bearer terminated at the SN, the configuration of the PSCell, a configuration of an SCell other than the PSCell, a physical layer configuration of the SCG, a MAC layer configuration of the SCG, and a security context of the SN. The security context of the SN may include one or a combination of the following information: a secondary base station key (secondary key), an SN integrity protection key, an SN encryption key, an SN integrity protection algorithm, an SN encryption algorithm, and a secondary base station key derivation parameter, for example, a secondary cell group counter (SCG counter) or a secondary key counter (secondary key counter, SK counter).

Operation 2: The terminal determines, according to the deactivation indication, that the primary secondary cell is in the deactivated state.

Specifically, after receiving the deactivation indication, the terminal reads content, in the indication, that indicates that the PSCell is in the deactivated state, and then may determine by default that the PSCell is in the deactivated state. Optionally, the terminal may further determine by default that an SCell in the SCG other than the PSCell is also in a deactivated state.

Operation 3: The terminal suspends an SCG RLC bearer associated with a bearer of the SN.

The bearer of the SN is a bearer established between the terminal and the SN, and may be any bearer that uses an air interface transmission resource of the SN, including an SN terminated bearer and/or an MN terminated bearer. The SN terminated bearer may be an SN terminated SCG bearer or an SN terminated split bearer. The MN terminated bearer may be an MN terminated split bearer or an MN terminated SCG bearer. The suspending an SCG RLC bearer may include skipping/stopping transmitting data by using the SCG RLC bearer, or stopping, by the terminal, using the air interface transmission resource of the SN. Optionally, a PDCP entity corresponding to the SCG RLC bearer (that is, a PDCP entity that belongs to a same DRB or logical channel (Logical Channel, LC)) is notified not to continue to send downlink data to an RLC entity of the SCG RLC bearer. Optionally, the PDCP entity performs a recovery (recovery) operation.

Optionally, that the terminal skips transmitting data by using the SCG RLC bearer may be implemented in any one or a combination of the following manners.

Manner 1: Freeze the RLC entity. To be specific, only an RLC action is stopped, but no SCG RLC re-establishment is performed, and the RLC entity is not deleted either.

Manner 2: If the bearer corresponding to the SCG RLC bearer is a split bearer, set a master cell group RLC bearer (MCG RLC bearer) corresponding to the split bearer as a primary path (primary path), and set an offloading threshold to be infinite. In this case, subsequent uplink data may be transmitted by using the MCG RLC bearer.

Manner 3: Make a bearer type change. For example, when a bearer type corresponding to the SCG RLC bearer is a split bearer or an SCG bearer, change the bearer type to an MCG bearer, to transmit data of the terminal by using an air interface transmission resource of the MN. Optionally, in this case, the RLC entity and/or an LCID of the SCG RLC bearer are not deleted, but the SCG RLC bearer is in a suspended state by default. It can be understood that the bearer type change in this case is a virtual change, and is different from a conventional bearer type change in which the SCG RLC bearer is deleted. Optionally, although the terminal no longer uses the air interface transmission resource of the SN, a user plane connection to the core network may still be retained on the SN.

Manner 4: SCG RLC re-establishment (re-establishment) may be performed. Optionally, re-establishment may be performed only for E-UTRA RLC. Optionally, the RLC entity of the SCG RLC bearer is retained. In the manner of performing SCG RLC re-establishment, a stored data packet may be transferred to the PDCP entity for processing, and cached segment data is cleared.

Operation 4: The terminal suspends a PDCP/SDAP entity of the SN, that is, skips processing data or transmitting data by using the PDCP/SDAP entity of the SN. The PDCP/SDAP entity of the SN may be a PDCP/SDAP entity of the SN terminated bearer. Specifically, the suspending the PDCP/SDAP entity may be implemented by a PDCP/SDAP freezing or PDCP/SDAP recovery (recovery) operation. It can be understood that the PDCP/SDAP entity of the SN may be shared with the MN or used independently by the SN. This is not limited. The PDCP/SDAP entity of the SN may also be referred to as a PDCP/SDAP entity terminated at the SN or a PDCP/SDAP entity of a bearer terminated at the SN.

Optionally, the terminal suspends the PDCP/SDAP entity of the SN on a basis of suspending the SCG RLC bearer, so that data transmission is suspended on the entire SN terminated bearer. Optionally, the terminal suspends only the PDCP/SDAP entity of the SN, but retains the SCG RLC bearer. Therefore, although data allocated to the SN is temporarily not processed by using the PDCP/SDAP entity of the SN, the SCG RLC bearer may still be used to send, to the terminal, for example, downlink data offloaded from the MN, or the SN receives, by using the SCG RLC bearer, uplink data sent by the terminal and transmits the uplink data to the MN for processing by a PDCP/SDAP entity of the MN. It can be understood that the suspending the PDCP/SDAP entity of the SN implicitly indicates that no data that originally should be processed by the PDCP/SDAP entity is to be transmitted on the SCG RLC bearer.

Operation 5: The terminal stops all or some of physical layer operations for the PSCell.

Optionally, the terminal stops any one or more of the following physical layer operations for the PSCell: physical downlink control channel (physical downlink control channel, PDCCH) monitoring (monitoring), CSI-RS measurement, channel quality indicator (Channel Quality Indicator, CQI) reporting, uplink channel sounding reference signal (sounding reference signal, SRS) transmission, beam (beam) management, and SCG timing advance (timing advance, TA) maintenance. It can be understood that, when one or more of the foregoing physical layer operations are stopped, another physical layer operation that is not stopped still continues. For example, the terminal stops PDCCH monitoring, but continues to perform CQI reporting.

Operation 6: Optionally, the terminal stops performing radio link failure (radio link failure, RLF) detection on the PSCell. Alternatively, optionally, the terminal stops performing CSI-RS-based radio link monitoring (radio link monitoring, RLM) on the PSCell, but performs RLM based on a synchronization signal block (synchronization signal and PBCH block), to perform RLF determining.

Operation 7: When performing RRM measurement, the terminal may still use the PSCell in the deactivated state as a serving cell for measurement, or may use the PSCell as a neighboring cell (neighbor cell) of a serving cell for measurement.

Operation 8: If an SRB3 is configured for the terminal, the terminal may suspend the SRB3. The SRB3 is a signaling bearer directly established between the terminal and the SN. The suspending the SRB3 may mean stopping transmitting an RRC message between the SN and the UE by using the SRB3, for example, including: clearing an RRC message that is not successfully sent to the secondary node.

Operation 9: The terminal performs a MAC reset (reset) operation on the SCG.

Optionally, in an implementation of this application, the method further includes S400: The terminal receives, from the access network device, a configuration parameter to be used by the terminal after the SCG is deactivated.

The configuration parameter may include a power parameter of the terminal.

After receiving the configuration parameter, the terminal may directly use the configuration parameter after the SCG is deactivated.

Optionally, before determining to deactivate the SCG, the access network device configures two different types of parameters for the terminal in advance. One type of parameter is used for terminal communication after the SCG is suspended. After receiving the deactivation indication, the terminal may automatically use this type of parameter. The other type is used for normal DC communication or terminal communication after the SCG is resumed.

It can be understood that S400 is performed before S402, and there is no sequence of performing S400 and S401. S400 may be performed before S401, or S401 may be performed before S400, or S400 and S401 may be performed simultaneously. This is not particularly limited in this application. In S402, if the terminal performs a combination of a plurality of operations, an execution sequence is not particularly limited in this application either. For example, the operation 9 may be performed before the operation 3.

With the communication method provided in this application, the terminal performs the deactivation operation on the SCG according to the indication of the MN or the SN. When the terminal is in a low-data-rate state, link communication of the SCG is suspended, and the configuration of the SCG is retained, thereby reducing energy consumption of the terminal and the network side, and reducing signaling overheads without performing a secondary node release procedure. Further, because the configuration of the SCG is retained, the terminal can quickly resume the link communication of the SCG without performing a secondary node addition procedure, thereby reducing signaling overheads and improving communication efficiency.

After performing the deactivation operation on the SCG, the terminal may resume, according to an indication of the network side, performing communication by using the SCG, that is, the terminal continues to perform DC communication. To activate an SCG, as shown in FIG. 6, this application provides a communication method. The method may be applied to a DC communication architecture. The method may be implemented by a terminal or an apparatus, such as a chip, applied to a terminal. In this embodiment of this application, an example in which a terminal performs the communication method is used for description.

The method includes the following steps.

S601. A terminal receives an activation (activation) indication from an access network device, where the activation indication indicates that a PSCell in an SCG is in an activated state.

The access network device is an MN or an SN of the terminal. The master node manages an MCG, and the secondary node manages the SCG. The MCG and/or the SCG are/is used for data communication of the terminal, and the SCG is in a deactivated state.

S602. The terminal activates (activate) the secondary cell group according to the activation indication.

The activation indication may also be referred to as an activation command, a recovery/resumption (recovery/resumption) indication/command, or the like. The activated state may also be referred to as a resumed state, an active state, or the like.

The activation indication may be included in a MAC CE, an RRC message, or physical layer signaling that is sent by the access network device to the terminal. Refer to related descriptions in the embodiment shown in FIG. 4. Details are not described again.

When the activation indication is included in a MAC CE, one or more bits in the MAC CE may be used as the activation indication. For a design of the MAC CE, refer to the MAC CE shown in FIG. 4 and related text descriptions. Details are not described herein again. It should be noted that, when the MAC CE is further used to indicate to activate one or more SCells other than the PSCell, the terminal may activate the one or more SCells according to the indication of the MAC CE, or may determine by default that all SCells in the SCG is to be activated, without reading a bit corresponding to each SCell.

Optionally, that the terminal activates the SCG according to the activation indication includes any one or more of the following operations.

Operation 1: The terminal uses, for DC communication between the SN and the terminal, a configuration, of the SCG, that is retained when a deactivation operation is performed on the secondary cell group. That is, the terminal restores (restore) the stored configuration, of the SCG, that is used for DC.

Operation 2: The terminal determines, according to the activation indication, that the primary secondary cell PSCell in the secondary cell group is in the activated state.

Operation 3: The terminal resumes (resume) an SCG RLC bearer associated with a bearer of the SN, including: continuing to transmit data by using the SCG RLC bearer. In other words, the terminal may use an air interface transmission resource of the SN again. The bearer may include an SN terminated bearer and/or an MN terminated bearer. Details are not described again. Optionally, a PDCP entity corresponding to an RLC entity of the SCG RLC bearer (that is, a PDCP entity that belongs to a same DRB or LC) is notified to continue to send uplink data to the RLC entity. Optionally, if a new secondary key is to be used in this case, the PDCP entity is re-established.

Optionally, that the terminal transmits data by using the SCG RLC bearer may be implemented in any one or a combination of the following manners.

Manner 1: Resume processing of a frozen RLC entity.

Manner 2: If the bearer corresponding to the SCG RLC bearer is a split bearer, a primary path configuration and an offloading threshold that are used before the deactivation may be used. In this case, subsequent uplink data may continue to be transmitted by using the SCG RLC bearer.

Manner 3: Make a bearer type change. For example, change an MCG bearer to a split bearer or an SCG bearer, so that the SCG RLC bearer is in an available state by default, and the terminal can use the air interface transmission resource of the SN again.

Operation 4: The terminal recovers a suspended PDCP/SDAP entity, and further processes data and transmits data by using the PDCP/SDAP entity.

Operation 5: The terminal resumes some or all of physical layer operations for the PSCell.

For example, the terminal may perform various physical layer operations such as starting to perform PDCCH monitoring, performing CSI-RS measurement, and continuing to perform CQI reporting. Details are not described again.

Operation 6: The terminal restarts RLF detection on the PSCell.

Operation 7: When performing RRM measurement, the terminal uses a PSCell in a deactivated state as a serving cell for measurement.

Operation 8: The terminal resumes a suspended SRB3.

Optionally, if a measurement is configured for the SN by using the SRB3, the terminal continues to perform measurement based on the measurement configuration of the SN, and reports a measurement result to the SN by using the SRB3.

Operation 9: The terminal performs a MAC reset (reset) operation on the SCG.

Operation 10: The terminal initiates random access on the PSCell. Optionally, the random access may be contention-based random access or non-contention-based random access. Optionally, if the random access is non-contention-based random access, the UE may listen to a PDCCH order on the PSCell.

Operation 11: The terminal derives a new secondary base station key (secondary key), further derives an encryption key and/or an integrity protection key, and configures the keys for the PDCP entity. Optionally, a key derivation parameter may be configured while a network delivers an activation (activation) indication, or may be configured while the network delivers a deactivation indication.

It can be understood that, in this application, a deactivation operation corresponds to an activation operation. After the terminal performs a deactivation operation on the SCG, a corresponding activation (resumption) operation is performed when the SCG is activated. For example, deactivating (suspending) the SCG RLC bearer corresponds to activating (resuming) the SCG RLC bearer. For descriptions of performing each activation (resumption) operation by the terminal, refer to a corresponding deactivation operation in the foregoing descriptions. Similar content is not described in detail again. It should be noted that, when the terminal determines by default, according to a deactivation indication, that all SCells are in a deactivated state, when performing an SCG activation operation, the terminal may activate (resume) all SCells, or may activate (resume) only one or more of the SCells. In S602, if the terminal performs a combination of a plurality of operations, an execution sequence is not particularly limited in this application either. For example, the operation 11 may be performed before the operation 4.

With the communication method provided in this application, the terminal performs the activation operation on the SCG according to the indication of the MN or the SN, to quickly resume link communication of the SCG without initiating an SCG addition procedure, thereby reducing energy consumption of the terminal and a network side, reducing signaling overheads, and improving communication efficiency.

Figure 8:
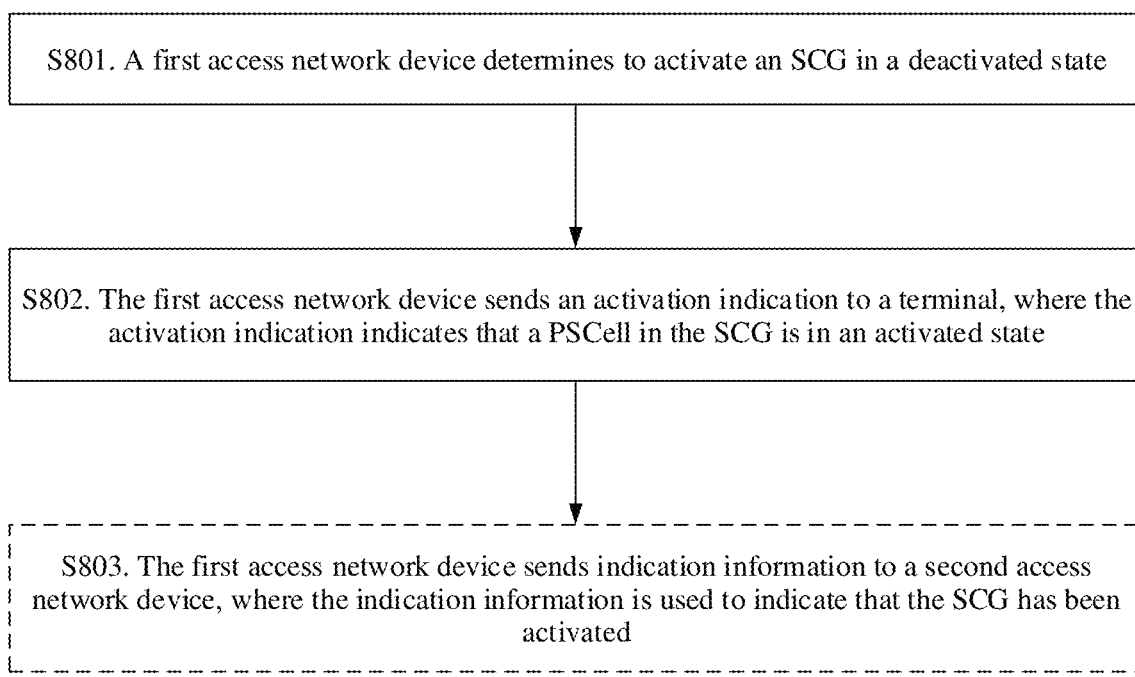
FIG. 8 is a schematic flowchart of a communication method according to an embodiment of this application.

Embodiments shown in FIG. 7 and FIG. 8 describe the communication method provided in this application from an access network device side.

To deactivate an SCG, as shown in FIG. 7, this application provides a communication method. The method may be applied to a DC communication architecture. The method includes the following steps.

S701. A first access network device determines to deactivate (deactivate) a secondary cell group.

The first access network device is an MN or an SN of a terminal. The master node manages an MCG, and the secondary node manages the SCG. The MCG and/or the SCG are/is used for data communication of the terminal.

Optionally, when the first access network device is the MN of the terminal, the terminal further communicates with a second access network device that serves as the SN.

Optionally, when the first access network device is the SN of the terminal, the terminal further communicates with a second access network device that serves as the MN.

Optionally, in an implementation of this application, that a first access network device determines to deactivate a secondary cell group includes: The first access network device determines to deactivate the secondary cell group, based on any one or more of auxiliary information provided by the terminal, a data transmission activity degree of the terminal on the first access network device, and auxiliary information provided by the second access network device.

The auxiliary information provided by the terminal may indicate that data transmission performed by the terminal by using the SCG is inactive, or indicate that the terminal has a power saving specification, or indicate that the terminal expects to suspend the SCG.

The data transmission activity degree may also be referred to as a data transmission activity status, and may be measured by using a volume of data transmitted on a bearer between the terminal and the first access network device. The data transmission activity degree may be indicated by an indication such as a high, medium, or low data volume, "presence of data", or "absence of data". The data volume may be determined by the first access network device, for example, by collecting statistics on data transmitted by a core network to the first access network device, or data offloaded from the second access network device that serves as a PDCP anchor node (anchor node). Alternatively, the first access network device may determine the data volume according to user plane indication information. For example, the core network sends user plane indication information to the first access network device through an S1/NG interface, to indicate a volume of data transmitted on a data bearer, where the data bearer may be an E-UTRAN radio access bearer (E-UTRAN radio access bearer, E-RAB), a packet data unit session (packet data unit session, PDU session), or a quality of service flow (quality of service, QoS flow); or the second access network device sends user plane indication information to the first access network device through an X2/Xn interface, to indicate a volume of data transmitted on an SCG RLC bearer of the SN. Alternatively, the first access network device may determine the data volume according to control plane indication information. For example, the core network sends control plane indication information to the first access network device through the S1/NG interface, to indicate a QoS parameter related to a data bearer, where the data bearer may be an E-UTRAN radio access bearer (E-UTRAN radio access bearer, E-RAB), a packet data unit session (packet data unit session, PDU session), or a quality of service flow (quality of service, QoS flow); or the second access network device (in this case, the MN) forwards, to the first access network device through the X2/Xn interface, the control plane indication information from the core network, to indicate the QoS parameter related to the data bearer or a QoS parameter corresponding to the SCG RLC bearer of the SN. Optionally, the data transmission activity degree may be an activity status of an SN terminated PDCP bearer (SN terminated PDCP bearer) or an activity status of the SCG RLC bearer, or may be an activity status of an SCG RLC bearer associated with an MN terminated bearer. When the data transmission activity degree of the terminal is high, the SN provides a data transmission service for the terminal, so that a data transmission rate can be increased, and data transmission reliability can be improved. When the data transmission activity degree of the terminal is low, a normal data transmission specification of the terminal can be met without using the SN. Therefore, the SCG may be deactivated. In an example, when the data transmission activity degree of the terminal is measured by using the data volume of the terminal, and when the data volume is less than a threshold, the first access network device may determine to deactivate the SCG. Correspondingly, when the data volume is less than a threshold, the first access network device may determine to retain link transmission of the SCG.

The auxiliary information provided by the second access network device may include information such as a power saving indication or a power saving request, information for requesting to deactivate the SCG, and a data transmission activity degree of the terminal on the second access network device.

Optionally, in an implementation of this application, after the first access network device determines to deactivate the SCG, the SN learns that the SCG is to be deactivated, and the SN retains or deletes an SCG configuration of the terminal. If the SCG configuration is retained, the SN does not have to generate a new SCG configuration of the terminal after the SCG is activated subsequently, but the SCG configuration retained before the activation may be inherited, or delta (delta) configuration may be performed. If the SCG configuration is deleted, the SN may have to generate a new SCG configuration after the SCG is activated subsequently. Optionally, the SN sends an indication message to the MN. The indication message may carry the SCG configuration of the terminal, so that the MN stores the SCG configuration. Further, optionally, when the SCG is activated subsequently, the MN sends the stored SCG configuration to the SN, so that the SN performs delta configuration based on the SCG configuration.

Optionally, in an implementation of this application, after the first access network device determines to deactivate the SCG, the MN learns that the SCG is to be deactivated, and the MN sends configuration information to the terminal, to indicate the terminal to use the configuration information after the SCG is deactivated. Optionally, the configuration information is an RRC reconfiguration message, and the configuration information may include one or a combination of the following information: a power parameter, a secondary base station key derivation parameter, a random access-related configuration, and the like. The power parameter is used when the SCG is in a deactivated state. The secondary base station key derivation parameter is used to derive a new secondary base station key after the SCG is activated. The random access-related configuration is used to perform random access on a PSCell after the SCG is activated. Further, optionally, some or all of the configuration information is generated by the SN. In an example, after learning that the SCG is to be deactivated, the SN generates some or all of the configuration information, and sends the some or all of the configuration information to the MN, so that the MN obtains the configuration information through combination, and sends the configuration information to the terminal.

S702. The first access network device sends a deactivation indication to the terminal, where the deactivation indication is used to indicate that a PSCell in the SCG is in a deactivated state.

The deactivation indication is included in physical layer signaling, or included in a MAC CE, or included in an RRC message. For specific descriptions of the deactivation indication, refer to related content in other embodiments of this application, for example, the embodiment shown in FIG. 4. Details are not described herein again.

For an operation performed after the terminal receives the deactivation indication, refer to related content in other embodiments of this application, for example, the embodiment shown in FIG. 4. Details are not described herein again.

The first access network device may send the deactivation indication to the terminal by using the second access network device, or the first access network device may directly send the deactivation indication to the terminal.

Optionally, in an implementation of this application, that the first access network device determines to deactivate the SCG includes: The first access network device suspends all SCG RLC bearers of the terminal. Specifically, the first access network device may stop transmitting data on any SCG RLC bearer associated (associated) with the terminal. The SCG RLC bearer associated with the terminal is an SCG RLC bearer associated with a bearer established between the first access network device and the terminal. For example, the bearer may be an SN terminated SCG/split bearer or an MN terminated split/SCG bearer.

Optionally, after suspending the SCG RLC bearer of the terminal, the first access network device may further determine, based on an activity status of a PDCP/SDAP entity of an SN terminated bearer associated with the terminal, to suspend a PDCP/SDAP entity of the first access network device, including: stopping processing data of the terminal by using the PDCP/SDAP entity. In another implementation, when the first access network device is the SN, the SN may continue to process data by using the PDCP entity of the SN terminated bearer, but data transmission with the terminal is performed by using an MCG bearer.

In addition, after suspending the SCG RLC bearer, the SN may stop transmitting, on the PSCell, all or some of signals transmitted between the first access network device and the terminal. The signals may include data and/or signaling. Optionally, the SN stops scheduling data transmission for the terminal on the PSCell, or the SN stops sending signaling related to the terminal, for example, stops sending a CSI-RS specific to the terminal.

Optionally, in an implementation of this application, the first access network device is the SN, and the second access network device is the MN. If the SN has suspended the SCG RLC bearer and suspended the PDCP entity of the SN terminated bearer, it indicates that the entire SN terminated bearer is suspended. The method further includes: The SN indicates each of the MN and the terminal to stop transmitting, by using an MCG RLC bearer, data on the SN terminated bearer, that is, indicates that an air interface transmission resource of the MN is unavailable for transmitting the data on the SN terminated bearer. Optionally, the SN may perform an explicit indication or an implicit indication. The implicit indication may be implicitly indicating, in an operation of deactivating the SCG, to suspend the PDCP entity of the SN terminated bearer and the corresponding MCG RLC bearer.

In an example, when the first access network device considers that none of SCG RLC bearers corresponding to a bearer associated with the terminal is active and the terminal has a power saving specification, the first access network device determines to send the deactivation indication to the terminal. In this case, the SN stops scheduling data transmission for the terminal by using the SCG. However, the terminal may still perform data transmission with the core network by using the MCG RLC bearer, that is, the air interface transmission resource of the MN, and by using a PDCP entity of the SN. Specifically, in a downlink direction, the SN may receive downlink data from the core network, and send the downlink data to the MN after PDCP processing, and the downlink data is sent to the terminal by using the MCG RLC bearer, that is, the air interface transmission resource of the MN. In an uplink direction, the terminal may send uplink data to the MN by using the MCG RLC bearer, then the MN sends the uplink data to the SN, and the SN sends the uplink data to the core network after processing by the PDCP entity. In this implementation, a network side may configure an MCG RLC bearer for each SN terminated bearer in advance.

Optionally, in an implementation of this application, the method further includes S703: The first access network device sends indication information to the second access network device. The indication information is used to indicate that the SCG has been deactivated.

Optionally, the indication information is any message or signaling sent by the first access network device to the second access network device, or is included in the message or the signaling. For example, when the first access network device is the MN, the indication information is an SN modification request (SN modification request) message; or when the first access network device is the SN, the indication information is an SN modification specified (SN modification specified) message.

Optionally, the first access network device notifies, by using the indication information, the second access network device to deactivate a data transmission tunnel of an X2/Xn interface corresponding to an SCG RLC bearer associated with a bearer terminated at the MN. The bearer terminated at the MN may be an MN terminated split bearer or an MN terminated SCG bearer. Optionally, when the first access network device is the SN and the second access network device is the MN, if the SN suspends the PDCP entity of the SN terminated bearer, the MN may further suspend a data transmission tunnel of an X2/Xn interface corresponding to the MCG RLC bearer corresponding to the SN terminated bearer.

Optionally, when the first access network device is the SN and the second access network device is the MN, the indication information is further used to indicate the MN to modify an MCG QoS parameter; or when the first access network device is the MN and the second access network device is the SN, the indication information is further used to indicate, to the SN, an MCG QoS parameter modified by the MN. If the UE still has data to be transmitted on the bearer, all data is carried on the MCG RLC bearer because the SCG RLC bearer is deactivated. Therefore, a QoS parameter corresponding to the MCG RLC bearer is to be modified accordingly. An objective is to enable the MN or the SN to adjust a scheduling policy or the like, to adjust a volume of data transmitted for the terminal.

With the foregoing communication method, the MN or the SN determines to deactivate the SCG, and indicates the terminal to perform the deactivation operation, to quickly stop link communication of the SCG, thereby reducing energy consumption of the network side and the terminal, and reducing signaling overheads without initiating a secondary node release procedure.

To activate an SCG, as shown in FIG. 8, this application provides a communication method. The method may be applied to a DC communication architecture. The method includes the following steps.

S801. A first access network device determines to activate an SCG in a deactivated state.

The first access network device is an MN or an SN of a terminal. The MN manages an MCG, and the SN manages the SCG. The MCG and/or the SCG are/is used for data communication of the terminal.

Optionally, in an implementation of this application, after the first access network device determines to activate the SCG, the SN learns that the SCG is to be activated, and the SN generates an SCG configuration of the terminal. Optionally, the SCG configuration may inherit an original configuration, or may be obtained through delta (delta) configuration. Optionally, the SN sends an indication message to the MN. The indication message may carry the SCG configuration of the terminal, so that the MN sends the SCG configuration to the terminal.

Optionally, in an implementation of this application, after the first access network device determines to activate the SCG, the MN learns that the SCG is to be activated, and the MN sends configuration information to the UE, to indicate the UE to use the configuration information after the SCG is activated. Optionally, the configuration information is an RRC reconfiguration message, and the configuration information may include one or a combination of the following information: a power parameter, a secondary base station key derivation parameter, a random access-related configuration, the SCG configuration, and the like. The power parameter is used when the SCG is in an activated state. The secondary base station key derivation parameter is used to derive a new secondary base station key after the SCG is activated. The random access-related configuration is used to perform random access on a PSCell after the SCG is activated. The SCG configuration is to be used by the terminal at an air interface of the SN after the SCG is activated. Optionally, some or all of the configuration information is generated by the SN. In an example, after learning that the SCG is to be activated, the SN generates some or all of the configuration information, and sends the some or all of the configuration information to the MN, so that the MN obtains the configuration information through combination, and sends the configuration information to the terminal.

S802. The first access network device sends an activation indication to the terminal, where the activation indication indicates that a PSCell in the SCG is in an activated state.

The activation indication is included in physical layer signaling, or included in a MAC CE, or included in an RRC message. For specific descriptions of the activation indication, refer to related content in other embodiments of this application, for example, the embodiment shown in FIG. 6. Details are not described herein again.

For an operation performed after the terminal receives the activation indication, refer to related content in other embodiments of this application, for example, the embodiment shown in FIG. 6. Details are not described herein again.

The first access network device may send the activation indication to the terminal by using the second access network device, or the first access network device may directly send the activation indication to the terminal.

Optionally, that the first access network device determines to activate the SCG includes: The first access network device determines to activate the SCG, based on any one or more of auxiliary information provided by the terminal, a data transmission activity degree of the terminal on the first access network device, and auxiliary information provided by the second access network device.

The auxiliary information provided by the terminal may indicate that the terminal has data that is to be transmitted by using the SCG, or indicate that the terminal cancels a power saving specification, or indicate that the terminal expects to resume the SCG.

The auxiliary information provided by the second access network device may include information such as a power saving indication or a power saving cancellation request, information for requesting to activate the SCG, and a data transmission activity degree of the terminal on the second access network device.

For specific descriptions of the data transmission activity degree, refer to related content in other embodiments of this application, for example, the embodiment shown in FIG. 7. Details are not described herein again.

Optionally, that the first access network device determines to activate the secondary cell group includes: The first access network device resumes data transmission on an SCG RLC bearer associated with a bearer associated with the terminal. Similarly, the first access network device may further resume performing data communication with the terminal by using a PDCP/SDAP entity on the first access network device.

Optionally, when the first access network device is the SN and the second access network device is the MN, the method further includes: The SN indicates each of the MN and the terminal to resume transmitting, by using an MCG RLC bearer, data on a bearer terminated at the SN. The SN may perform an explicit indication or an implicit indication. Details are not described again.

Optionally, the first access network device resumes scheduling data/signal transmission for the terminal on the PSCell.

Optionally, the method further includes S803: The first access network device sends indication information to the second access network device. The indication information is used to indicate that the SCG has been activated.

Optionally, the indication information is used to indicate the second access network device to activate a data transmission tunnel of an X2/Xn interface corresponding to an SCG RLC bearer associated with a bearer terminated at the MN. The indication information corresponds to the indication information described in step S703 in the embodiment shown in FIG. 7.

It can be understood that, in this application, an operation of indicating, by the access network device, the terminal to deactivate the SCG corresponds to an operation of indicating the terminal to activate the SCG. For specific descriptions of determining, by the access network device, to activate (resume) the SCG and sending the activation indication, refer to corresponding content of deactivating the SCG in the foregoing descriptions. Details are not described again.

With the foregoing communication method, the MN or the SN determines to activate the SCG, and indicates the terminal to perform the activation operation, to quickly resume link communication of the SCG, thereby reducing energy consumption of a network side and the terminal, and reducing signaling overheads without initiating a secondary node addition procedure.

Figure 9:
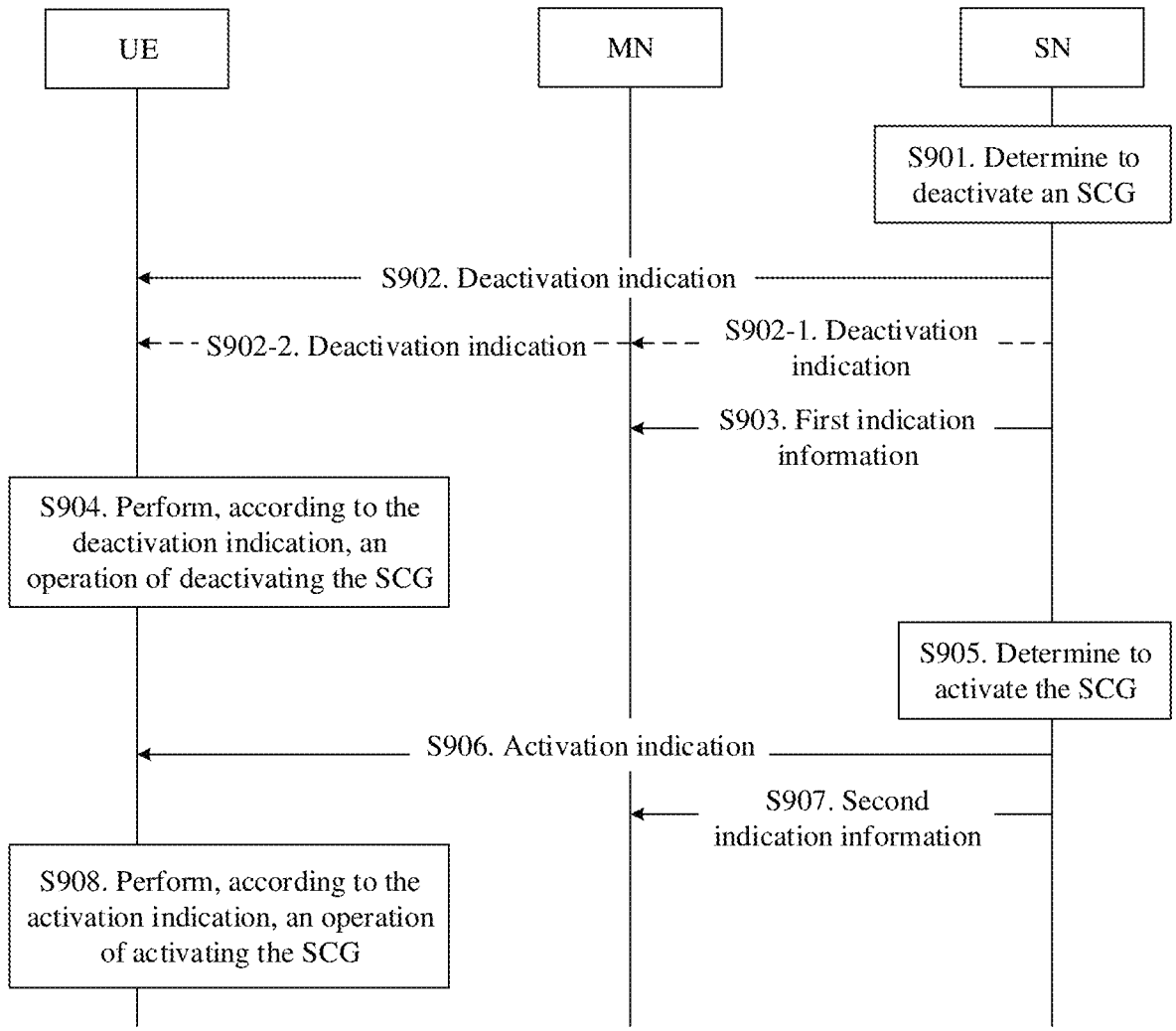
FIG. 9 is a schematic signaling flowchart of a communication method according to an embodiment of this application.

FIG. 9 is a schematic signaling flowchart of a communication method according to this application. FIG. 9 is used to further describe the embodiments shown in FIG. 4 to FIG. 8. Content described above is not described in detail again. In the embodiment shown in FIG. 9, an example in which a first access network device is an SN, a second access network device is an MN, and a terminal is UE is used for description. The UE may perform DC communication by using an MCG managed by the MN and/or an SCG managed by the SN. The method includes the following steps.

S901. The SN determines to deactivate the SCG.

The SN may determine whether to deactivate the SCG, based on any one or more of auxiliary information provided by the UE, a data transmission activity degree of the terminal on the SN, or auxiliary information provided by the MN. The auxiliary information provided by the MN may include a power saving indication. The auxiliary information provided by the UE may be directly sent by the UE to the SN by using an SRB3; or may be first sent by the UE to the MN, and then sent by the MN to the SN.

S902. The SN sends a deactivation indication to the UE.

Optionally, the SN may directly send the deactivation indication to the UE.

Optionally, the SN may send the deactivation indication to the UE by using the MN. In this implementation, S902 may include the following steps: S902-1. The SN sends a deactivation indication to the MN. S902-2. The MN sends the deactivation indication to the UE.

Optionally, the MN may parse the deactivation indication, and add the deactivation indication to a message/signaling sent by the MN to the UE; or the MN may transparently transmit the deactivation indication to the UE, that is, the MN does not parse the deactivation indication, but encapsulates the deactivation indication in a container (container) and sends the deactivation indication to the UE by using a message/signaling.

Optionally, the method further includes: S903. The SN sends first indication information to the MN, to notify the MN that the SCG of the UE has been suspended.

It can be understood that there is no sequence of performing S902 and S903. S902 may be performed before S903, or S903 may be performed before S902, or S902 and S903 are performed simultaneously. This is not limited.

S904. The UE performs, according to the deactivation indication, an operation of deactivating the SCG.

For specific descriptions of the operation of deactivating the SCG, refer to related content in other embodiments of this application, for example, the embodiment shown in FIG. 4. Details are not described herein again.

When a data volume of the UE increases, the SN may determine to activate the SCG to continue to provide a communication service for the UE. The method further includes: S905. The SN determines to activate the SCG.

S906. The SN sends an activation indication to the UE.

The activation indication may be directly sent by the SN to the UE, or sent by the SN to the MN and then forwarded by the MN.

Optionally, the method further includes: S907. The SN sends second indication information to the MN, where the indication information is used to notify the MN that the SCG of the UE has been activated.

S908. The UE performs, according to the activation indication, an operation of activating the SCG.

For specific descriptions of the operation of activating the SCG, refer to related content in other embodiments of this application, for example, the embodiment shown in FIG. 5. Details are not described herein again.

It can be understood that there is no sequence of performing S906 and S907. S906 may be performed before S907, or S907 may be performed before S906, or S906 and S907 are performed simultaneously. This is not limited.

With the communication method provided in this embodiment of this application, the UE deactivates/activates the SCG according to the indication of the SN, to quickly interrupt or resume link communication performed by the UE by using the SCG, without performing a secondary node release/addition procedure, thereby reducing signaling overheads, reducing energy consumption of the UE and a network side, and improving communication efficiency.

Figure 10:
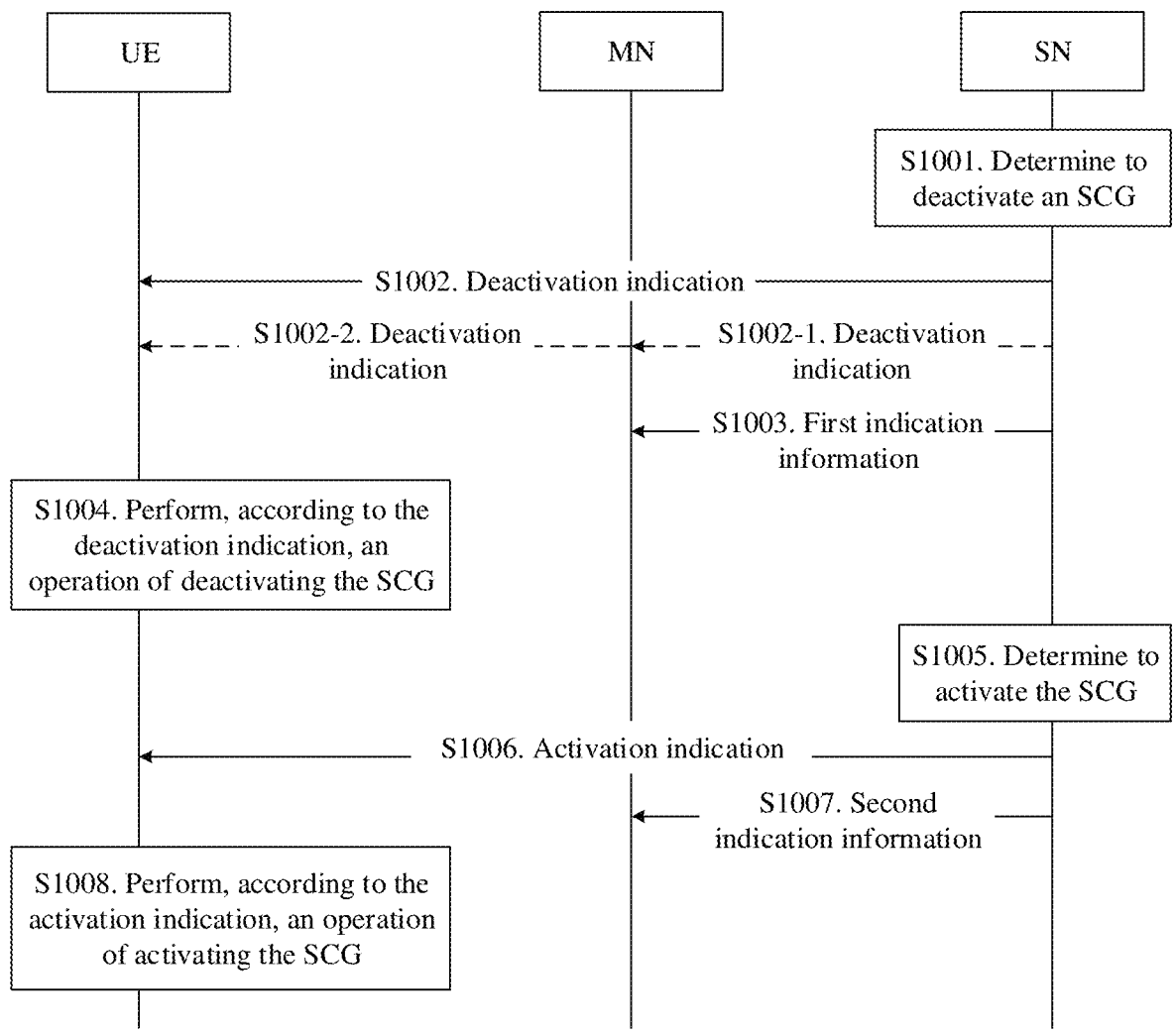
FIG. 10 is a schematic signaling flowchart of a communication method according to an embodiment of this application.

FIG. 10 is a schematic signaling flowchart of a communication method according to an embodiment of this application. FIG. 10 is a schematic signaling flowchart of a communication method according to this application. FIG. 10 is used to further describe the embodiments shown in FIG. 4 to FIG. 8. Content described above is not described in detail again. In the embodiment shown in FIG. 10, an example in which a first access network device is an MN, a second access network device is an SN, and a terminal is UE is used for description. The UE may perform DC communication by using an MCG managed by the MN and/or an SCG managed by the SN. The method includes the following steps.

S1001. The MN determines to deactivate the SCG.

The MN may determine whether to deactivate the SCG, based on any one or more of auxiliary information provided by the UE, a data transmission activity degree of the UE on the MN, or auxiliary information provided by the SN. The auxiliary information provided by the UE may be information directly sent by the UE to the MN by using an SRB1; or may be sent by the UE to the SN, and then sent by the SN to the MN. The auxiliary information provided by the SN may include: a data transmission activity degree of the UE on the SN, request information indicating that the SN is to save power, and the like.

S1002. The MN sends a deactivation indication to the UE.

Optionally, the MN may directly send the deactivation indication to the UE.

Optionally, the MN may send the deactivation indication to the UE by using the SN. In this implementation, S1002 may include the following steps: S1002-1. The MN sends a deactivation indication to the SN. S1002-2. The SN sends the deactivation indication to the UE.

S1003. The MN sends first indication information to the SN, to notify the SN that the SCG of the UE has been suspended.

It can be understood that there is no sequence of performing S1002 and S1003. S1002 may be performed before S1003, or S1003 may be performed before S1002, or S1002 and S1003 are performed simultaneously. This is not limited.

S1004. The UE performs, according to the deactivation indication, an operation of deactivating the SCG.

For specific descriptions of the operation of deactivating the SCG, refer to related content in other embodiments of this application, for example, the embodiment shown in FIG. 4. Details are not described herein again.

When a data volume of the UE increases, the MN may determine to activate the SCG to continue to provide a communication service for the UE. The method further includes: S1005. The MN determines to activate the SCG.

S1006. The MN sends an activation indication to the UE.

S1007. The MN sends second indication information to the SN, to notify the SN that the SCG of the UE has been activated.

S1008. The UE performs, according to the activation indication, an operation of activating the SCG.

For specific descriptions of the operation of activating the SCG, refer to related content in other embodiments of this application, for example, the embodiment shown in FIG. 5. Details are not described herein again.

It can be understood that there is no sequence of performing S1006 and S1007. S1006 may be performed before S1007, or S1007 may be performed before S1006, or S1006 and S1007 are performed simultaneously. This is not limited.

With the communication method provided in this embodiment of this application, the UE deactivates/activates the SCG according to the indication of the MN, to quickly interrupt or resume link communication performed by the UE by using the SCG, without performing a secondary node release/addition procedure, thereby reducing signaling overheads, reducing energy consumption of the UE and a network side, and improving communication efficiency.

It should be noted that the method for determining, by the SN, to deactivate/activate the SCG in FIG. 9 and the method for determining, by the MN, to deactivate/activate the SCG in FIG. 10 are merely examples. The SCG deactivation method and the SCG activation method shown in this application may be implemented separately or in combination. For example, after the SN determines to deactivate the SCG, the MN may alternatively determine to activate the SCG. Similarly, after the MN determines to deactivate the SCG, the SN may alternatively determine to activate the SCG. This is not limited.

The foregoing describes in detail examples of the communication method according to this application. It can be understood that, to implement the foregoing functions, the communications apparatus includes corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In this application, the communications apparatus may be divided into function units based on the foregoing method examples. For example, each function unit may be obtained through division based on each function, or two or more functions may be integrated into one processing unit. The integrated unit may be implemented in a form of hardware, or may be implemented in a form of a software functional unit. It is noted that, in this application, division into the units is an example, and is merely a logical function division. During actual implementation, another division manner may be used.

Figure 11:
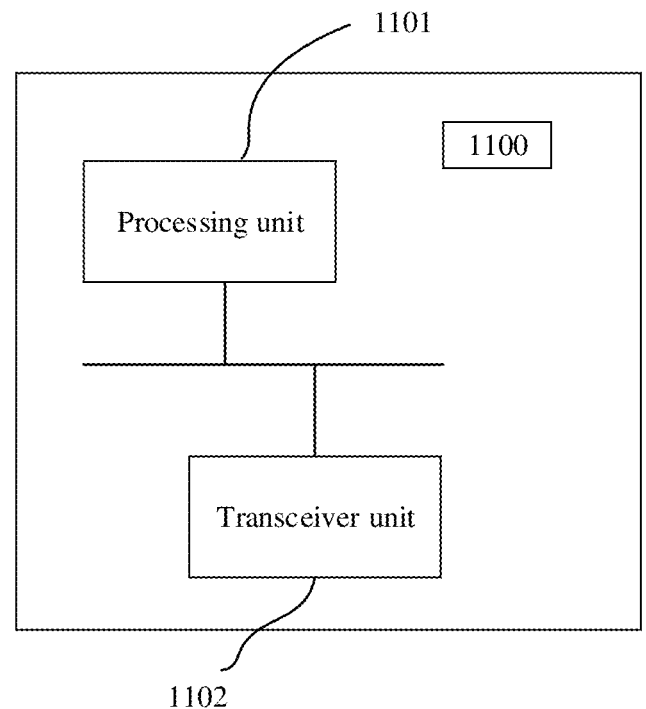
FIG. 11 is a schematic diagram of a structure of a communications apparatus 1100 according to an embodiment of this application.

For example, a communications apparatus 1100 shown in FIG. 11 includes a processing unit 1101 and a transceiver unit 1102.

In an implementation of this application, the communications apparatus 1100 is configured to support a terminal device in implementing a function of the terminal in the communication method provided in the embodiments of this application. For example, the transceiver unit 1102 may be configured to receive a deactivation indication from an access network device. The deactivation indication is used to indicate that a primary secondary cell (PSCell) in a secondary cell group (SCG) is in a deactivated state. The processing unit 1101 is configured to perform a deactivation operation on the secondary cell group according to the deactivation indication. For another example, the transceiver unit 1102 is configured to receive an activation indication from the access network device. The activation indication indicates that the primary secondary cell in the secondary cell group is in an activated state. The processing unit 1101 is configured to activate the secondary cell group according to the activation indication. The access network device is a master node (MN) or a secondary node (SN) of the terminal during DC communication. The master node manages a master cell group (MCG), and the secondary node manages the secondary cell group. The master cell group and/or the secondary cell group are/is used for data communication of the terminal.

In a possible implementation, the processing unit 1101 may be configured to perform one or more deactivation operations on the secondary cell group, for example, operations such as retaining a configuration of the secondary cell group and stopping data transmission on an SCG RLC bearer corresponding to a bearer of the secondary node. For detailed descriptions of each deactivation operation, refer to related content in other embodiments of this application, for example, the embodiment shown in FIG. 4. Details are not described again.

In a possible implementation, the processing unit 1101 may be configured to perform one or more operations of activating the secondary cell group, for example, operations such as reusing the configuration, of the secondary cell group, that is retained when the deactivation operation is performed on the secondary cell group, and resuming data transmission on the SCG RLC bearer corresponding to the bearer of the secondary node. For detailed descriptions of each activation operation, refer to related content in other embodiments of this application, for example, related content in the embodiment shown in FIG. 6. Details are not described again.

In another implementation of this application, the communications apparatus 1100 is configured to support an access network device, for example, a base station, in implementing a function of the access network device in the communication method provided in the embodiments of this application. The access network device is a master node or a secondary node of a terminal during DC communication. The master node manages a master cell group, and the secondary node manages a secondary cell group. The master cell group and/or the secondary cell group are/is used for data communication of the terminal. For example, the processing unit 1101 is configured to determine to deactivate the secondary cell group, and the transceiver unit 1102 is configured to send a deactivation indication to the terminal. The deactivation indication is used to indicate that a primary secondary cell in the secondary cell group is in a deactivated state. For another example, the processing unit 1101 is configured to determine to activate the secondary cell group in a deactivated state, and the transceiver unit 1102 is configured to send an activation indication to the terminal. The activation indication indicates that the primary secondary cell in the secondary cell group is in an activated state.

In a possible implementation, the processing unit 1101 is specifically configured to determine to deactivate or activate the secondary cell group, based on any one or more of auxiliary information provided by the terminal, data transmission activity degree of the terminal on the access network device, and auxiliary information provided by a second access network device. For specific descriptions of the auxiliary information and the data transmission activity degree, refer to related content in other embodiments of this application, for example, the embodiments shown in FIG. 7 and FIG. 8. Details are not described again.

In a possible implementation, the processing unit 1101 may be configured to perform one or more operations of determining to deactivate the secondary cell group, for example, stopping data transmission on an SCG RLC bearer corresponding to a bearer of the secondary node, and stopping processing data of the terminal by using a PDCP/SDAP entity of the access network device. For detailed descriptions of each deactivation operation, refer to related content in other embodiments of this application, for example, the embodiment shown in FIG. 7. Details are not described again.

In a possible implementation, the processing unit 1101 may be configured to perform one or more operations of determining to activate the secondary cell group, for example, resuming data transmission on the SCG RLC bearer corresponding to the bearer of the secondary node, and resuming processing data of the terminal by using the PDCP/SDAP entity of the access network device. For detailed descriptions of each activation operation, refer to related content in other embodiments of this application, for example, the embodiment shown in FIG. 8. Details are not described again.

Optionally, the processing unit 1101 is further configured to send indication information to the second access network device, where the indication information is used to indicate that the secondary cell group has been deactivated.

Optionally, the processing unit 1101 is further configured to send indication information to the second access network device, where the indication information is used to indicate that the secondary cell group has been activated.

For specific descriptions of the indication information, refer to related content in other embodiments of this application, for example, the embodiments shown in FIG. 7 and FIG. 8. Details are not described herein again.

The deactivation indication or the activation indication may be included in a MAC CE, physical layer signaling, or an RRC message. For detailed descriptions, refer to related content in other embodiments of this application, for example, the embodiments shown in FIG. 4 to FIG. 6. Details are not described again. For example, for a design of the MAC CE, refer to related descriptions of FIG. 5.

When the access network device is the secondary node, the master node is the second access network device; or when the access network device is the master node, the secondary node is the second access network device.

For detailed descriptions of the operations performed by the functional units of the communications apparatus 1100, for example, refer to the behavior of the terminal or the access network device (the master node or the secondary node) in the embodiments of the communication method provided in this application, for example, related content in the embodiments shown in FIG. 4 to FIG. 10.

In another implementation of this application, in hardware implementation, one processor may perform a function of the processing unit 1101, and a transceiver (a transmitter/a receiver) and/or a communications interface may perform a function of the transceiver unit 1102. The processing unit 1101 may be embedded in or independent of a processor of a terminal in a form of hardware, or may be stored in a memory of a terminal or a base station in a form of software, so that the processor invokes and performs operations corresponding to the foregoing functional units.

Figure 12:
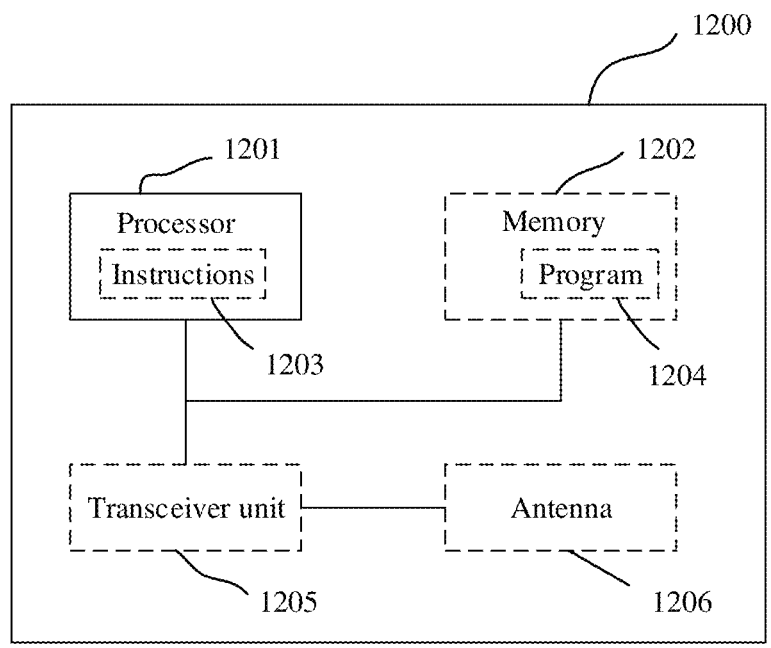
FIG. 12 is a schematic diagram of a structure of a communications apparatus 1200 according to an embodiment of this application.

FIG. 12 is a schematic diagram of a structure of a communications apparatus 1200 according to this application. The communications apparatus 1200 may be configured to implement the communication methods described in the foregoing method embodiments. The communications apparatus 1200 may be a chip, a terminal, an access network device, another wireless communication device, or the like.

The communications apparatus 1200 includes one or more processors 1201. The one or more processors 1201 may support the communications apparatus 1200 in implementing the communication method performed by the terminal (the UE) in the embodiments of this application, for example, the method performed by the terminal in the embodiments shown in FIG. 4 to FIG. 10. Alternatively, the one or more processors 1201 may support the communications apparatus 1200 in implementing the method performed by the access network device in the embodiments of this application, for example, the method performed by the access network device (including the first access network device or the second access network device) in the embodiments shown in FIG. 4 to FIG. 10.

The processor 1201 may be a general-purpose processor or a dedicated processor. For example, the processor 1201 may include a central processing unit (central processing unit, CPU) and/or a baseband processor. The baseband processor may be configured to process communication data (for example, the first message above), and the CPU may be configured to implement corresponding control and processing functions, execute a software program, and process data of the software program.

Further, the communications apparatus 1200 may further include a transceiver unit 1205, configured to input (receive) or output (send) a signal.

For example, the communications apparatus 1200 may be a chip. The transceiver unit 1205 may be an input and/or output circuit of the chip, or the transceiver unit 1205 may be an interface circuit of the chip. The chip may serve as a component of UE, a base station, or another wireless communications device.

For another example, the communications apparatus 1200 may be UE or a base station. The transceiver unit 1205 may include a transceiver or a radio frequency chip. The transceiver unit 1205 may further include a communications interface.

Optionally, the communications apparatus 1200 may further include an antenna 1206, and may be configured to support the transceiver unit 1205 in implementing a transceiver function of the communications apparatus 1200.

Optionally, the communications apparatus 1200 may include one or more memories 1202 that store a program (which may be alternatively instructions or code) 1203. The program 1203 may be run by the processor 1201, so that the processor 1201 performs the method described in the foregoing method embodiments. Optionally, the memory 1202 may further store data. Optionally, the processor 1201 may further read the data (for example, predefined information) stored in the memory 1202. The data and the program 1203 may be stored at a same storage address, or the data and the program 1203 may be stored at different storage addresses.

The processor 1201 and the memory 1202 may be disposed separately, or may be integrated together, for example, integrated on a board or integrated into a system on chip (system on chip, SOC).

In a possible design, the communications apparatus 1200 is a terminal or a chip that may be applied to a terminal. The terminal has a DC communication function. The transceiver unit 1205 may be configured to receive a deactivation indication from an access network device. The deactivation indication is used to indicate that a primary secondary cell (PSCell) in a secondary cell group (SCG) is in a deactivated state. The processor 1201 may be configured to perform a deactivation operation on the secondary cell group according to the deactivation indication. For another example, the transceiver unit 1205 may be configured to receive an activation indication from the access network device. The activation indication indicates that the primary secondary cell in the secondary cell group is in an activated state. The processor 1201 may be configured to activate the secondary cell group according to the activation indication. The access network device is a master node (MN) or a secondary node (SN) of the terminal during DC communication. The master node manages a master cell group (MCG), and the secondary node manages the secondary cell group. The master cell group and/or the secondary cell group are/is used for data communication of the terminal.

In a possible design, the communications apparatus 1200 is an access network device or a chip that may be applied to an access network device. The access network device may serve as a master node or a secondary node in DC communication. The master node manages a master cell group, and the secondary node manages a secondary cell group. The master cell group and/or the secondary cell group are/is used for data communication of a terminal. For example, the processor 1201 may be configured to determine to deactivate the secondary cell group, and the transceiver unit 1205 may be configured to send a deactivation indication to the terminal. The deactivation indication is used to indicate that a primary secondary cell in the secondary cell group is in a deactivated state. For another example, the processor 1201 may be configured to determine to activate the secondary cell group in a deactivated state, and the transceiver unit 1205 may be configured to send an activation indication to the terminal. The activation indication indicates that the primary secondary cell in the secondary cell group is in an activated state.

For detailed descriptions of the operations performed by the communications apparatus 1200 in the foregoing possible designs, refer to the behavior of the terminal or the access network device (the master node or the secondary node) in the embodiments of the communication method provided in this application, for example, related content in the embodiments shown in FIG. 4 to FIG. 10. Details are not described again.

It should be understood that steps in the foregoing method embodiments may be implemented by using a logic circuit in a form of hardware or instructions in a form of software in the processor 1201. The processor 1201 may be a CPU, a digital signal processor (digital signal processor, DSP), an application specific integrated circuit (application specific integrated circuit, ASIC), a field programmable gate array (field programmable gate array, FPGA), or another programmable logic device, for example, a discrete gate, a transistor logic device, or a discrete hardware component.

This application further provides a computer program product. When the computer program product is executed by the processor 1201, the communication method according to any method embodiment of this application is implemented. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media.

The computer program product may be stored in the memory 1202. For example, the computer program product is a program 1204. After undergoing processing procedures such as preprocessing, compilation, assembly, and connection, the program 1204 is finally converted into an executable target file that can be executed by the processor 1201.

This application further provides a computer-readable storage medium. The computer-readable storage medium stores a computer program. When the computer program is executed by a computer, the communication method according to any method embodiment of this application is implemented. The computer program may be a high-level language program, or may be an executable target program.

For example, the computer-readable storage medium is the memory 1202. The memory 1202 may be a volatile memory or a non-volatile memory, or the memory 1202 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct Rambus RAM, DR RAM).

Figure 13:
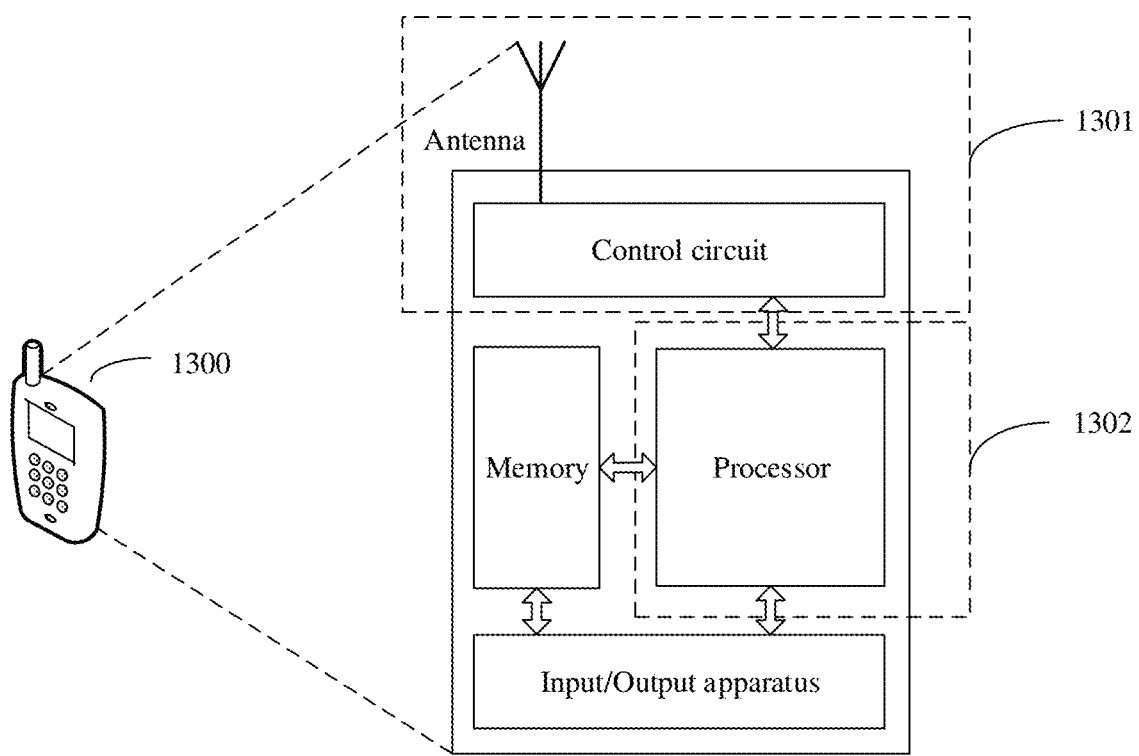
FIG. 13 is a schematic diagram of a structure of a terminal 1300 according to an embodiment of this application.

When the communications apparatus 1200 is a terminal, FIG. 13 is a schematic diagram of a structure of a terminal according to this application. The terminal 1300 may be used in the system shown in FIG. 1, to perform a function of the terminal in the method embodiments. For ease of description, FIG. 13 shows only main components of the terminal.

As shown in FIG. 13, the terminal 1300 includes a processor, a memory, a control circuit, an antenna, and an input/output apparatus. The processor is mainly configured to: process a communication protocol and communication data, and control the entire terminal. For example, the processor generates a first message, and then sends the first message by using the control circuit and the antenna. The memory is mainly configured to store a program and data, for example, store a communication protocol and the foregoing configuration information. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus is, for example, a touchscreen, a display screen, or a keyboard, and is mainly configured to receive data input by a user and output data to the user.

The processor may read the program in the memory, interpret and execute instructions included in the program, and process data in the program. When information is to be sent through the antenna, the processor performs baseband processing on the to-be-sent information, and outputs a baseband signal to a radio frequency circuit. The radio frequency circuit performs radio frequency processing on the baseband signal to obtain a radio frequency signal, and sends the radio frequency signal in an electromagnetic wave form through the antenna. When an electromagnetic wave (namely, the radio frequency signal) that carries information arrives at the terminal, the radio frequency circuit receives the radio frequency signal by using the antenna, converts the radio frequency signal into the baseband signal, and outputs the baseband signal to the processor. The processor converts the baseband signal into the information, and processes the information.

A person skilled in the art may understand that for ease of description, FIG. 13 shows only one memory and only one processor. In an actual terminal, there may be a plurality of processors and a plurality of memories. The memory may also be referred to as a storage medium, a storage device, or the like. This is not limited in this application.

In an optional implementation, the processor in FIG. 13 may integrate functions of the baseband processor and the CPU. A person skilled in the art may understand that the baseband processor and the CPU may be alternatively independent processors, and are interconnected by using technologies such as a bus. A person skilled in the art may understand that the terminal may include a plurality of baseband processors to adapt to different network standards, and the terminal may include a plurality of CPUs to enhance a processing capability of the terminal. All components of the terminal may be connected by using various buses. The baseband processor may also be referred to as a baseband processing circuit or a baseband processing chip. The CPU may also be referred to as a central processing circuit or a central processing chip. A function of processing the communication protocol and the communication data may be embedded into the processor, or may be stored in the memory in a form of a program, so that the processor executes the program in the memory to implement a baseband processing function.

In this application, the antenna and the control circuit that have a sending function and a receiving function may be considered as a transceiver unit 1301 of the terminal 1300. The transceiver unit 1301 is configured to support the terminal device in implementing the receiving function in the method embodiment, or is configured to support the terminal device in implementing the sending function in the method embodiment. The processor that has a processing function is considered as a processing unit 1302 of the terminal 1300. As shown in FIG. 13, the terminal 1300 includes the transceiver unit 1301 and the processing unit 1302. The transceiver unit may also be referred to as a transceiver, a transceiver apparatus, or the like. Optionally, a component configured to implement a receiving function in the transceiver unit 1301 may be considered as a receiving unit, and a component configured to implement a sending function in the transceiver unit 1301 may be considered as a sending unit. In other words, the transceiver unit 1301 includes the receiving unit and the sending unit. The receiving unit may also be referred to as a receiver, an input port, a receiver circuit, or the like, and the sending unit may be referred to as a transmitter, a transmitter circuit, or the like.

The processing unit 1302 may be configured to execute a program stored in the memory, to control the transceiver unit 1301 to receive a signal and/or send a signal, to complete a function of the terminal in the foregoing method embodiments. In an implementation, it may be considered that a function of the transceiver unit 1301 is implemented by using a transceiver circuit or a special-purpose transceiver chip.

The processing unit 1302 may perform the functions of the processing unit 1101 in the communications apparatus 1100 shown in FIG. 11 or the processor 1201 in the communications apparatus 1200 shown in FIG. 12. The transceiver unit 1301 may perform the functions of the transceiver unit 1102 in the communications apparatus 1100 shown in FIG. 11 or the transceiver unit 1205 in the communications apparatus 1200 shown in FIG. 12. Details are not described again.

Figure 14:
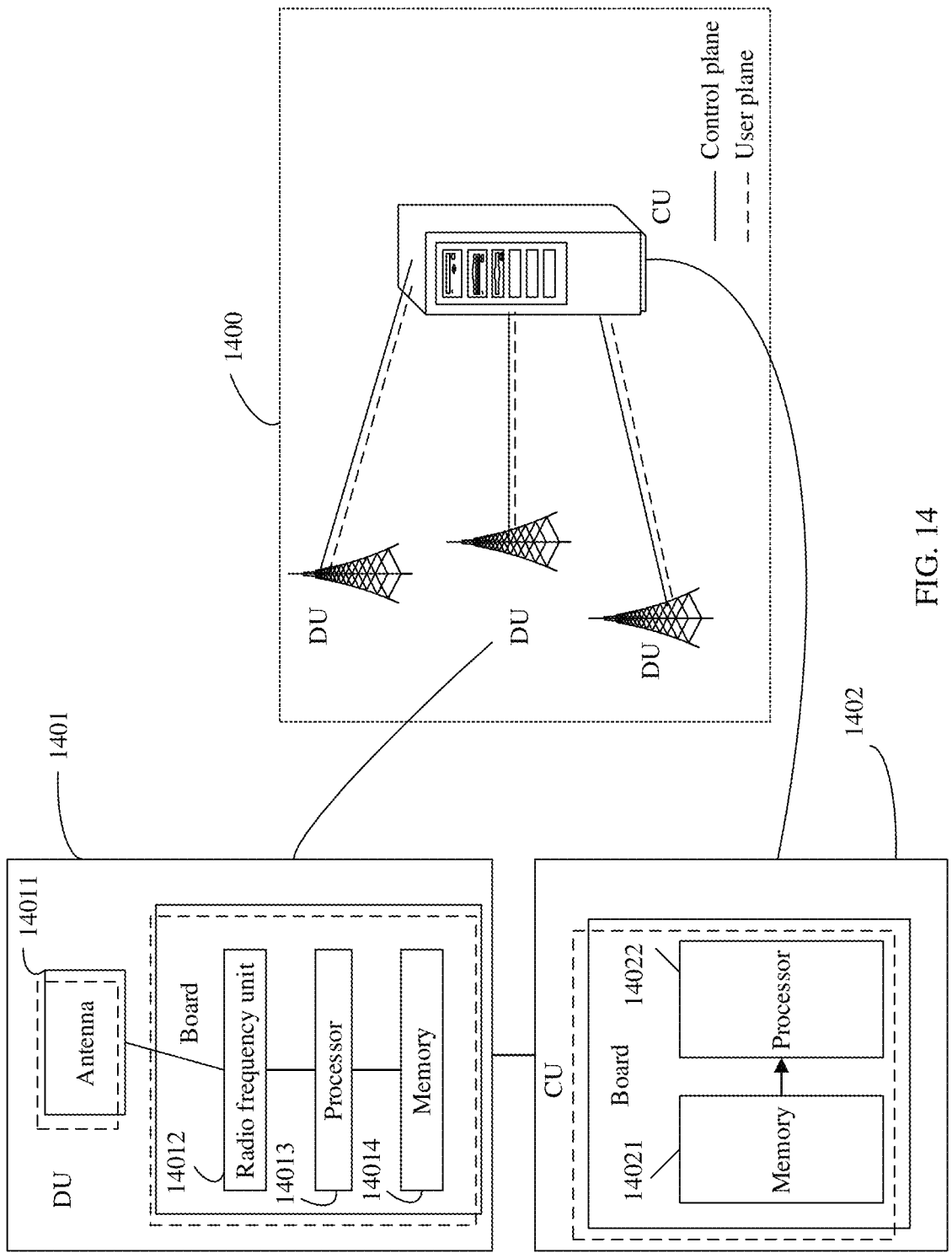
FIG. 14 is a schematic diagram of a structure of a base station 1400 according to an embodiment of this application.

When the communications apparatus 1200 is an access network device, FIG. 14 is a schematic diagram of a structure of a base station according to an embodiment of this application. As shown in FIG. 14, the base station may be applied to the system shown in FIG. 1, and perform the functions of the access network device in the foregoing method embodiments. The base station has a function of serving as a master node or a secondary node during DC communication. The base station 1400 may include one or more DUs 1401 and one or more CUs 1402. The DU 1401 may include at least one antenna 14011, at least one radio frequency unit 14012, at least one processor 14013, and at least one memory 14014. The DU 1401 is mainly configured to receive and send a radio frequency signal, convert a radio frequency signal and a baseband signal, and perform some baseband processing. The CU 1402 may include at least one processor 14022 and at least one memory 14021. The CU 1402 and the DU 1401 may communicate with each other through an interface. A control plane (Control plane) interface may be Fs-C, for example, F1-C. A user plane (User Plane) interface may be Fs-U, for example, F1-U.

The CU 1402 is mainly configured to perform baseband processing, control the base station, and the like. The DU 1401 and the CU 1402 may be physically disposed together, or may be physically disposed separately, that is, a distributed base station. The CU 1402 is a control center of the base station, may also be referred to as a processing unit, and is mainly configured to complete a baseband processing function. For example, the CU 1402 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP, such as a radio link control (radio link control, RLC) layer and a media access control (media access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer.

In addition, optionally, the base station 1400 may include one or more radio frequency units (RU), one or more DUs, and one or more CUs. The DU may include at least one processor 14013 and at least one memory 14014. The RU may include at least one antenna 14011 and at least one radio frequency unit 14012. The CU may include at least one processor 14022 and at least one memory 14021.

In an example, the CU 1402 may include one or more boards, and a plurality of boards may jointly support a radio access network (for example, a 5G network) of a single access standard, or may separately support radio access networks (such as an LTE network, a 5G network, or another network) of different access standards. The memory 14021 and the processor 14022 may serve one or more boards. In other words, a memory and a processor may be independently disposed on each board, or a plurality of boards may share a same memory and a same processor. In addition, a specified circuit may be further disposed on each board. The DU 1401 may include one or more boards, and a plurality of boards may jointly support a radio access network (for example, a 5G network) of a single access standard, or may separately support radio access networks (such as an LTE network, a 5G network, or another network) of different access standards. The memory 14014 and the processor 14013 may serve one or more boards. In other words, a memory and a processor may be independently disposed on each board, or a plurality of boards may share a same memory and a same processor. In addition, a specified circuit may be further disposed on each board.

The DU and the CU may jointly perform the functions of the processing unit 1101 in the communications apparatus 1100 shown in FIG. 11 or the processor 1201 in the communications apparatus 1200 shown in FIG. 12. The RU may perform the functions of the transceiver unit 1102 in the communications apparatus 1100 shown in FIG. 11 or the transceiver unit 1205 in the communications apparatus 1200 shown in FIG. 12. Details are not described again.

This application further provides a communications system, including a first access network device and a second access network device. The first access network device may serve as a master node, and the second access network device may serve as a secondary node.

Optionally, the communications system further includes a terminal. The terminal may access both the first access network device and the second access network device. For functions of devices in the communications system, refer to related descriptions in other embodiments of this application. Details are not described.

A person skilled in the art may be clearly aware that, the descriptions of the embodiments provided in this application may be referenced to each other. For convenience and conciseness of description, for example, for functions of the apparatuses and devices provided in the embodiments of this application and the performed steps, refer to related descriptions of the method embodiments of this application. The method embodiments and the apparatus embodiments may also be referenced, combined, or cited to each other.

In the several embodiments provided in this application, the disclosed system, apparatus, and method may be implemented in other manners. For example, some features of the method embodiments described above may be ignored or not performed. The described apparatus embodiments are merely examples. For example, the division into units is merely logical function division and may be other division during actual implementation. For example, a plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It is to be understood that sequence numbers of the foregoing processes do not mean execution sequences in the various embodiments of this application. The execution sequences of the processes is to be determined based on functions and internal logic of the processes, and do not have to be construed as any limitation on the implementation processes of the embodiments of this application. In addition, in the embodiments of this application, the terminal and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all operations in the embodiments of this application may be performed.

What is claimed is:

1. A communication method, comprising:
receiving a deactivation indication from an access network device, wherein the deactivation indication indicates that a primary secondary cell in a secondary cell group is in a deactivated state, wherein the access network device comprises a master node or a secondary node of a terminal, wherein in response to the access network device comprising the master node, the master node manages a master cell group used in data communication between the terminal and the master node, wherein in response to the access network device comprising the secondary node, the secondary node manages the secondary cell group used in data communication between the terminal and the secondary node, and wherein each of the master node and the secondary node is configured to determine to deactivate the primary secondary cell in the secondary cell group, and in response to the master node determining to deactivate the primary secondary cell, the master node is configured to send the deactivation indication to the terminal, or in response to the secondary node determining to deactivate the primary secondary cell, the secondary node is configured to send the deactivation indication to the terminal;
performing a deactivation operation on the secondary cell group according to the deactivation indication, wherein the deactivation operation on the secondary cell group according to the deactivation indication comprises retaining a configuration of the secondary cell group; and
performing radio resource measurement on the primary secondary cell by using the primary secondary cell in the deactivated state as a serving cell or a neighbor cell of a serving cell.

2. The method according to claim 1, wherein a media access control (MAC) control element (CE) comprises the deactivation indication as one or more bits in the MAC CE.

3. The method according to claim 2, wherein the deactivation indication corresponds to a serving cell identifier of the primary secondary cell.

4. The method according to claim 3, wherein the performing the deactivation operation on the secondary cell group according to the deactivation indication further comprises:
determining, according to the deactivation indication, that the primary secondary cell is in the deactivated state.

5. The method according to claim 1, wherein the performing the deactivation operation on the secondary cell group according to the deactivation indication further comprises:
determining, according to the deactivation indication, that all secondary cells other than the primary secondary cell are in a deactivated state, or determining that all secondary cells are released.

6. The method according to claim 1, wherein the configuration of the secondary cell group comprises one or more of the following information:
a secondary cell group radio link control bearer (SCG RLC) configuration, a packet data convergence protocol (PDCP), service data adaptation protocol (SDAP) configuration of a bearer terminated at the secondary node, a primary secondary cell configuration, a secondary cell configuration, a physical layer configuration of the secondary cell group, a media access control (MAC) layer configuration of the secondary cell group, and a security context of the secondary node.

7. The method according to claim 1, wherein the performing the deactivation operation on the secondary cell group according to the deactivation indication further comprises:
stopping data transmission on a radio link control bearer of the secondary cell group.

8. The method according to claim 1, wherein the performing the deactivation operation on the secondary cell group according to the deactivation indication further comprises:
sending, to the master node by using the master cell group, a measurement result based on a measurement configured by the secondary node, wherein the measurement configured by the secondary node is configured by using a signaling radio bearer between the secondary node and the terminal.

9. The method according to claim 1, wherein the performing the deactivation operation on the secondary cell group according to the deactivation indication further comprises:
stopping performing data communication by using a packet data convergence protocol (PDCP) entity or a service data adaptation protocol (SDAP) entity on the secondary node.

10. The method according to claim 1, wherein the performing the deactivation operation on the secondary cell group according to the deactivation indication further comprises:
stopping a physical layer operation for the primary secondary cell; or
stopping radio link failure (RLF) detection on the primary secondary cell.

11. A communication apparatus, comprising: at least one processor, wherein the at least one processor is coupled to at least one memory, the memory is configured to store a computer program or instructions, and the at least one processor is configured to execute the computer program or the instructions in the memory, to enable the at least one processor to perform:

receiving a deactivation indication from an access network device, wherein the deactivation indication indicates that a primary secondary cell in a secondary cell group is in a deactivated state, wherein the access network device comprises a master node or a secondary node of a terminal, wherein in response to the access network device comprising the master node, the master node manages a master cell group used in data communication between the terminal and the master node, wherein in response to the access network device comprising the secondary node, the secondary node manages the secondary cell group used in data communication between the terminal and the secondary node, and wherein each of the master node and the secondary node is configured to determine to deactivate the primary secondary cell in the secondary cell group, and in response to the master node determining to deactivate the primary secondary cell, the master node is configured to send the deactivation indication to the terminal, or in response to the secondary node determining to deactivate the primary secondary cell, the secondary node is configured to send the deactivation indication to the terminal;

performing a deactivation operation on the secondary cell group according to the deactivation indication, wherein the deactivation operation on the secondary cell group according to the deactivation indication comprises retaining a configuration of the secondary cell group; and performing radio resource measurement on the primary secondary cell by using the primary secondary cell in the deactivated state as a serving cell or a neighbor cell of a serving cell.

12. The apparatus according to claim 11, wherein a media access control (MAC) control element (CE) comprises the deactivation indication as one or more bits in the MAC CE.

13. The apparatus according to claim 12, wherein the deactivation indication corresponds to a serving cell identifier of the primary secondary cell.

14. The apparatus according to claim 13, wherein the performing the deactivation operation on the secondary cell group according to the deactivation indication further comprises:
determining, according to the deactivation indication, that the primary secondary cell is in the deactivated state.

15. The apparatus according to claim 11, wherein the performing the deactivation operation on the secondary cell group according to the deactivation indication further comprises:
determining, according to the deactivation indication, that all secondary cells other than the primary secondary cell are in a deactivated state, or determining that all secondary cells are released.

16. The apparatus according to claim 11, wherein the configuration of the secondary cell group comprises one or more of the following information:
a secondary cell group radio link control bearer (SCG RLC) configuration, a packet data convergence protocol (PDCP), service data adaptation protocol (SDAP) configuration of a bearer terminated at the secondary node, a primary secondary cell configuration, a secondary cell configuration, a physical layer configuration of the secondary cell group, a media access control (MAC) layer configuration of the secondary cell group, and a security context of the secondary node.

17. The apparatus according to claim 11, wherein the performing the deactivation operation on the secondary cell group according to the deactivation indication further comprises at least one of the following operations:
stopping data transmission on a radio link control bearer of the secondary cell group;
stopping performing data communication by using a packet data convergence protocol (PDCP) entity or a service data adaptation protocol (SDAP) entity on the secondary node;
stopping a physical layer operation for the primary secondary cell; or
stopping radio link failure (RLF) detection on the primary secondary cell.

18. The apparatus according to claim 11, wherein the performing the deactivation operation on the secondary cell group according to the deactivation indication further comprises:
sending, to the master node by using the master cell group, a measurement result based on a measurement configured by the secondary node, wherein the measurement configured by the secondary node is configured by using a signaling radio bearer between the secondary node and the terminal.

19. A communication apparatus, comprising: at least one processor, wherein the at least one processor is coupled to at least one memory, the memory is configured to store a computer program or instructions, and the at least one processor is configured to execute the computer program or the instructions in the memory, to enable the at least one processor to perform:

receiving an activation indication from an access network device, wherein the activation indication indicates that a primary secondary cell in a secondary cell group is in an activated state, wherein the access network device comprises a master node or a secondary node of a terminal, wherein in response to the access network device comprising the master node, the master node manages a master cell group used in data communication between the terminal and the master node, wherein in response to the access network device comprising the secondary node, the secondary node manages the secondary cell group used in data communication between the terminal and the secondary node, and wherein each of the master node and the secondary node is configured to determine to activate the primary secondary cell in the secondary cell group, and in response to the master node determining to activate the primary secondary cell, the master node is configured to send the activation indication to the terminal, or in response to the secondary node determining to activate the primary secondary cell, the secondary node is configured to send the activation indication to the terminal;

activating the secondary cell group according to the activation indication, wherein the secondary cell group is activated by using a configuration of the secondary cell group that is retained when a deactivation operation is performed on the secondary cell group;

receiving a deactivation indication from the access network device, wherein the deactivation indication indicates that a primary secondary cell in a secondary cell group is in a deactivated state, wherein each of the master node and the secondary node is configured to determine to deactivate the primary secondary cell in the secondary cell group, and in response to the master node determining to deactivate the primary secondary cell, the master node is configured to send the deactivation indication the terminal, or in response to the secondary node determining to deactivate the primary secondary cell, the secondary node is configured to send the deactivation indication to the terminal; and performing radio resource measurement on the primary secondary cell by using the primary secondary cell in the deactivated state as a serving cell or a neighbor cell of a serving cell.

20. The apparatus according to claim 19, wherein the activating the secondary cell group according to the activation indication comprises:

determining, according to the activation indication, that the primary secondary cell is in the activated state.

21. The apparatus according to claim 19, wherein the activating the secondary cell group according to the activation indication comprises:

determining, according to the activation indication, that one or more secondary cells other than the primary secondary cell are in an activated state.

22. The apparatus according to a claim 19, wherein the activating the secondary cell group according to the activation indication comprises at least one of the following operations:

resuming transmitting data on a radio link control bearer of the secondary cell group;

resuming performing data communication by using a packet data convergence protocol (PDCP) entity or a service data adaptation protocol (SDAP) entity on the secondary node;

resuming a physical layer operation for the primary secondary cell;

resuming radio link failure (RLF) detection on the primary secondary cell.

23. The apparatus according to claim 19, wherein the activating the secondary cell group according to the activation indication comprises:

sending, to the secondary node by using the secondary cell group, a measurement result based on a measurement configured by the secondary node, wherein the measurement configured by the secondary node is configured by using a signaling radio bearer between the secondary node and the terminal.

24. The apparatus according to claim 19, wherein a media access control (MAC) control element (CE) comprises the activation indication as one or more bits in the MAC CE.

25. The apparatus according to claim 19, wherein the configuration of the secondary cell group comprises one or more of the following information:

a secondary cell group radio link control bearer (SCG RLC) configuration, a packet data convergence protocol (PDCP), service data adaptation protocol (SDAP) configuration of a bearer terminated at the secondary node, a primary secondary cell configuration, a secondary cell configuration, a physical layer configuration of the secondary cell group, a media access control (MAC) layer configuration of the secondary cell group, and a security context of the secondary node.

* * * * *